US009985802B2

(12) United States Patent
Jiang et al.

(10) Patent No.: US 9,985,802 B2
(45) Date of Patent: May 29, 2018

(54) CHANNEL ESTIMATION ENHANCEMENTS

(71) Applicant: QUALCOMM Incorporated, San Diego, CA (US)

(72) Inventors: Jing Jiang, San Diego, CA (US); Krishna Kiran Mukkavilli, San Diego, CA (US); Naga Bhushan, San Diego, CA (US); Tingfang Ji, San Diego, CA (US); Joseph Binamira Soriaga, San Diego, CA (US); Peter Gaal, San Diego, CA (US); John Edward Smee, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 14/705,787

(22) Filed: May 6, 2015

(65) Prior Publication Data
US 2016/0127153 A1 May 5, 2016

Related U.S. Application Data

(60) Provisional application No. 62/073,683, filed on Oct. 31, 2014.

(51) Int. Cl.
*H04L 25/02* (2006.01)
*H04W 72/04* (2009.01)
(Continued)

(52) U.S. Cl.
CPC .......... *H04L 25/0226* (2013.01); *H04L 5/005* (2013.01); *H04L 5/0048* (2013.01);
(Continued)

(58) Field of Classification Search
CPC ... H04L 25/0226; H04L 5/0096; H04L 5/005; H04L 5/0082; H04L 5/0058; H04L 47/12
See application file for complete search history.

(56) References Cited

U.S. PATENT DOCUMENTS 8,989,148 B2 * 3/2015 Vrzic .................. H04W 74/004
370/331
2007/0082692 A1 * 4/2007 Tirkkonen ............ H04L 5/0023
455/522

(Continued)

FOREIGN PATENT DOCUMENTS

WO WO-2009099810 A2 8/2009

OTHER PUBLICATIONS

Lee S., et al., "Channel Estimation Approach with Variable Pilot Density to Mitigate Interference over Time-Selective Cellular OFDM Systems," IEEE Transactions on Wireless Communications, Jul. 2008, vol. 7 (7), pp. 2694-2704.

(Continued)

*Primary Examiner* — Mohammad S Anwar
(74) *Attorney, Agent, or Firm* — Qualcomm IP Dept.; James Hunt Yancey, Jr.

(57) ABSTRACT

The disclosure relates in some aspects to techniques for improved channel estimation. For example, a device can specify a pilot structure where pilot density differs over time. As another example, a device can indicate that a pilot from a prior transmission time interval (TTI) can be used for channel estimation. As another example, a device can employ frequency domain physical resource block (PRB) bundling with the bundling information signaling. As yet another example, a device can use an adjustable traffic-to-pilot ratio (TPR) for throughput optimization. Other aspects, embodiments, and features are also discussed and claimed.

29 Claims, 21 Drawing Sheets

(51) Int. Cl.
*H04L 12/801* (2013.01)
*H04L 5/00* (2006.01)

(52) U.S. Cl.
CPC .......... *H04L 5/0058* (2013.01); *H04L 5/0082* (2013.01); *H04L 5/0096* (2013.01); *H04L 47/12* (2013.01); *H04W 72/0446* (2013.01)

(56) References Cited

U.S. PATENT DOCUMENTS

| | | |
|---|---|---|
| 2008/0219361 A1 | 9/2008 | Guey et al. |
| 2009/0082002 A1 | 3/2009 | Kim et al. |
| 2009/0092194 A1 | 4/2009 | Wang et al. |
| 2009/0175370 A1 | 7/2009 | Kuroda et al. |
| 2010/0246515 A1* | 9/2010 | Tsai ................. H04L 5/005 370/329 |
| 2011/0261781 A1 | 10/2011 | Vrzic et al. |
| 2012/0039411 A1* | 2/2012 | Khojastepour ...... H04B 7/0452 375/267 |
| 2012/0201152 A1* | 8/2012 | Yoo .................. H04B 17/345 370/252 |
| 2013/0044692 A1* | 2/2013 | Nory .................. H04L 25/0228 370/329 |
| 2013/0301563 A1* | 11/2013 | Gupta .................. H04L 5/0048 370/329 |
| 2014/0016622 A1 | 1/2014 | Bao et al. |
| 2014/0220970 A1* | 8/2014 | Yang ................... H04W 48/20 455/434 |
| 2014/0269520 A1* | 9/2014 | Yi ....................... H04L 5/0051 370/329 |

OTHER PUBLICATIONS

International Search Report and Written Opinion—PCT/US2015/056980—ISA/EPO—Apr. 20, 2016.

* cited by examiner

CHANNEL ESTIMATION ENHANCEMENTS

CROSS-REFERENCE TO RELATED APPLICATION(S)

This application claims priority to and the benefit of provisional patent application No. 62/073,683 filed in the U.S. patent office on Oct. 31, 2014, the entire content of which is incorporated herein by reference.

INTRODUCTION

Aspects of the disclosure relate generally to wireless communication, and more specifically, but not exclusively, to techniques for enhancing channel estimation that can be useful to provide better channel quality estimates and/or reduced latency associated with decoding based on channel estimates.

Wireless communication networks are widely deployed to provide various communication services such as telephony, video, data, messaging, broadcasts, and so on. Such networks, which are usually multiple access networks, support communications for multiple users by sharing the available network resources.

In some wireless communication networks, a wireless device decodes and/or demodulates received data based on an estimate of the channel through which the data traveled. Some wireless communication networks employ pilot-assisted channel estimation where a base station (e.g., an enhanced Node B (eNB)) broadcasts pilot signals and an access terminal (e.g., a mobile device such as a user equipment (UE)) that receives the pilot signals generates an estimate of the channel based on the pilot signals. For example, in 3rd Generation Partnership Project (3GPP) Long Term Evolution (LTE), an eNB broadcasts a pilot reference signal such as a demodulation reference signal (DMRS), whereby a UE that receives the pilot reference signal generates a channel estimate based on the received pilot reference signal.

Conventionally (e.g., in LTE), DMRS pilots are fixed both in time and frequency. Also, in LTE, DMRS pilots are transmitted at the end of each slot. Thus, one set of pilots could be estimated only at the end of a given transmission time interval (TTI).

BRIEF SUMMARY OF SOME EXAMPLES

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication. The apparatus includes a processing circuit configured to determine a pilot structure where pilot density differs over time within a transmission period; and a communication interface coupled to the processing circuit and configured to transmit an indication of the pilot structure.

Another aspect of the disclosure provides a method of communication including determining a pilot structure where pilot density differs over time within a transmission period; and transmitting an indication of the pilot structure.

Another aspect of the disclosure provides an apparatus configured for communication. The apparatus including means for determining a pilot structure where pilot density differs over time within a transmission period; and means for transmitting an indication of the pilot structure.

Another aspect of the disclosure provides a non-transitory computer-readable medium storing computer-executable code, including code to determine a pilot structure where pilot density differs over time within a transmission period; and transmit an indication of the pilot structure.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The disclosure relates in some aspects to improvements in channel estimation. For example, a first device may adapt its pilots and/or provide information to enhance channel estimation at a second device. As a more specific example, an access point (e.g., a base station such as an eNB) may adapt its pilots and/or provide information to enhance channel estimation at an access terminal. Through the use of the disclosed techniques, better channel quality estimates may be achieved and/or latency associated with decoding based on channel estimates can be reduced.

The disclosure relates in some aspects to a pilot structure that has a variable pilot density. For example, pilot density can be denser (e.g., denser in at least one of time, frequency, or power) at the beginning of a data burst that at a later portion of the data burst. As a non-limiting example, a first TTI of a data burst could include four pilots while subsequent TTIs of the data burst include two pilots. Accordingly, a device can obtain information for a channel estimate earlier as compared to conventional techniques. Also, a device may use periodic pilot updates to improve the channel estimate.

The disclosure relates in some aspects to across-TTI filtering techniques. For example, a device can apply pilot filtering across subframes (SFs). As a more specific example, a device can use information that it previously obtained for a prior TTI or frame to filter a current TTI or frame.

In some aspects, these two techniques facilitate demodulation on-the-fly at a device (e.g., an access terminal). Consequently, in some cases, improvements may be seen in demodulation latency, decoding latency, and memory requirements.

The disclosure relates in some aspects to enhanced frequency domain physical resource block (PRB) bundling. For example, a device can specify a uniform pilot structure with PRB bundling to facilitate channel estimation. In addition, network (NW) signaling of a precoding matrix indicator (PMI) can enable joint channel estimation across multiple PRBs and/or PRB bundle groups.

The disclosure relates in some aspects to providing an adjustable traffic-to-pilot ratio (TPR) for throughput optimization. For example, devices may use different TPRs for different modulation and coding schemes (MCSs), ranks, and so forth.

Figure 1:
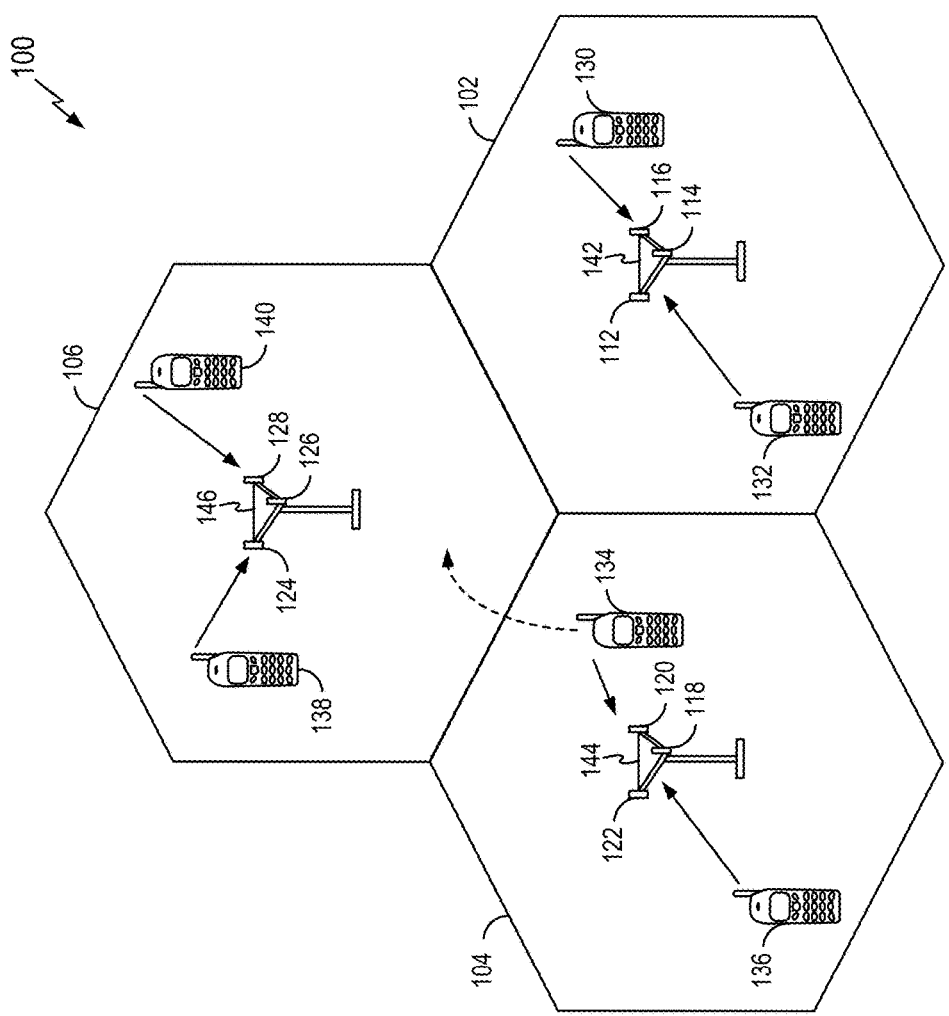
FIG. 1 is a block diagram illustrating an example of an access network in which one or more aspects of the disclosure may find application.

The various concepts presented throughout this disclosure may be implemented across a broad variety of communication systems, network architectures, and communication standards. Referring to FIG. 1, by way of example and without limitation, an example access network 100 is shown. The access network 100 can be implemented according to various network technologies including, without limitation, fifth generation (5G) technology, fourth generation (4G) technology, third generation (3G) technology, and other network architectures. Thus, various aspects of the disclosure may be extended to networks based on Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The access network 100 includes multiple cellular regions (cells), including cells 102, 104, and 106, each of which may include one or more sectors. Cells may be defined geographically, e.g., by coverage area. In a cell that is divided into sectors, the multiple sectors within a cell can be formed by groups of antennas with each antenna responsible for communication with ATs in a portion of the cell. For example, in the cell 102, antenna groups 112, 114, and 116 may each correspond to a different sector. In the cell 104, antenna groups 118, 120, and 122 may each correspond to a different sector. In the cell 106, antenna groups 124, 126, and 128 may each correspond to a different sector.

The cells 102, 104, and 106 may include several access terminals (ATs) that may be in communication with one or more sectors of each cell 102, 104, or 106. For example, ATs 130 and 132 may be in communication with an access point (AP) 142, ATs 134 and 136 may be in communication with an AP 144, and ATs 138 and 140 may be in communication with an AP 146. In various implementations, an AP may be referred to or implemented as a base station, a NodeB, an eNodeB, and so on; while an AT may be referred to or implemented as a user equipment (UE), a mobile station, a remote wireless device, and so on.

Figure 2:
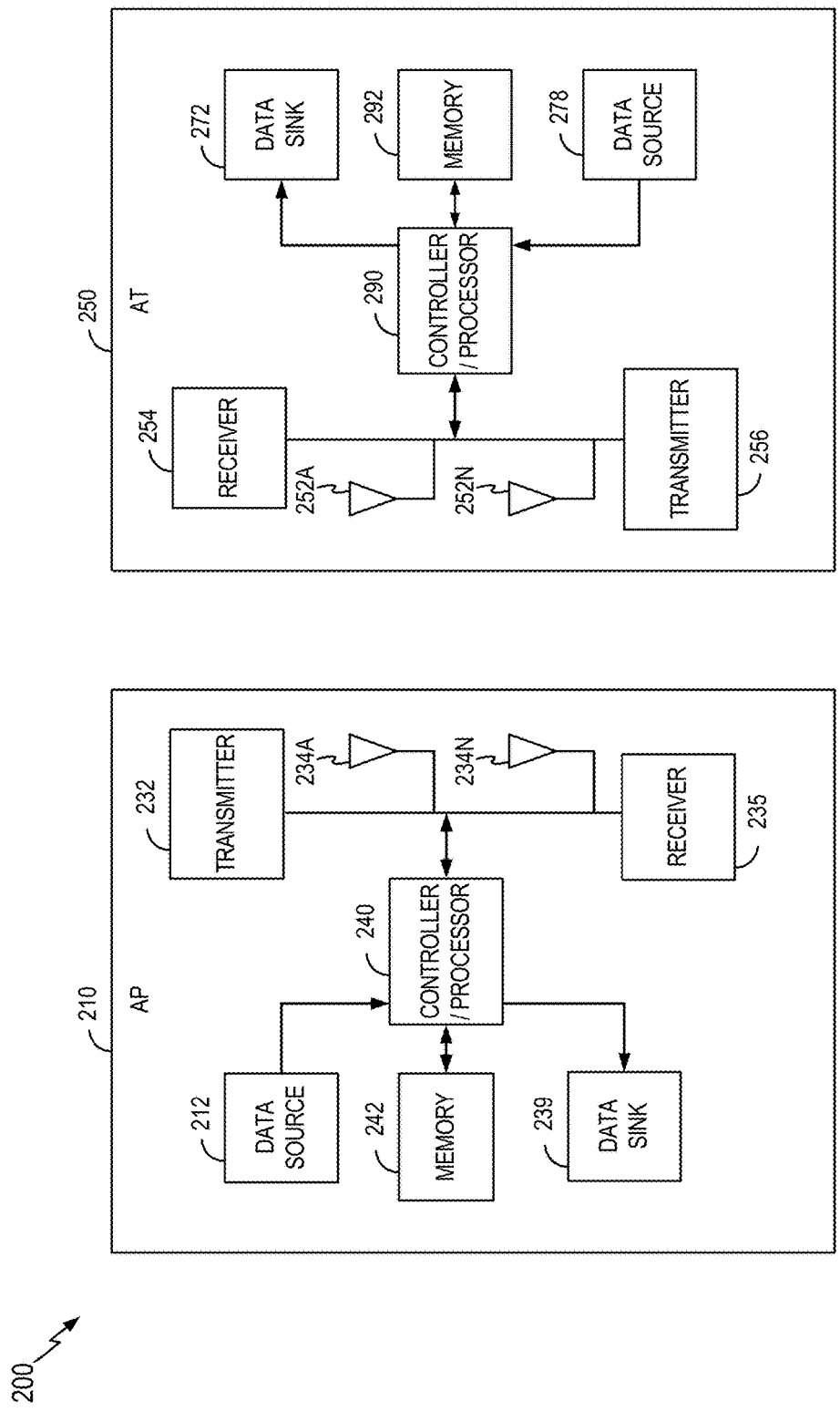
FIG. 2 is a block diagram illustrating an example of an access terminal in communication with an access point in a communication system according to some aspects of the disclosure.

FIG. 2 is a block diagram of system 200 including an access point (AP) 210 in communication with an access terminal (AT) 250, where the AP 210 and the AT 250 may be configured to provide functionality as taught herein. The AP 210 may be the AP 142, 144, or 146 in FIG. 1, and the AT 250 may be the AT 130, 132, 134, 136, 138, or 140 in FIG. 1. In various operating scenarios, the AP 210 and/or the AT 250 may be a transmitter or transmitting device, or a receiver or receiving device, or both. Examples of such transmitters, transmitting devices, receivers, and receiving devices are illustrated in FIGS. 1, 3, 5-8, 11, 13, 17, and 21.

In a downlink communication from the AP 210 to the AT 250, a controller or processor (controller/processor) 240 may receive data from a data source 212. Channel estimates may be used by the controller/processor 240 to determine the coding, modulation, spreading, and/or scrambling schemes for the transmit processor 220. These channel estimates may be derived from a reference signal transmitted by the AT 250 or from feedback from the AT 250. A transmitter 232 may provide various signal conditioning functions including amplifying, filtering, and modulating frames onto a carrier for downlink transmission over a wireless medium through antennas 234A-234N. The antennas 234A-234N may include one or more antennas, for example, including beam steering bidirectional adaptive antenna arrays, MIMO arrays, or any other suitable transmission/reception technologies.

At the AT 250, a receiver 254 receives the downlink transmission through antennas 252A-252N (e.g., representing one or more antennas) and processes the transmission to recover the information modulated onto the carrier. The information recovered by the receiver 254 is provided to a controller/processor 290. The controller/processor 290 descrambles and despreads the symbols, and determines the most likely signal constellation points transmitted by the AP 210 based on the modulation scheme. These soft decisions may be based on channel estimates computed by the controller/processor 290. The soft decisions are then decoded and deinterleaved to recover the data, control, and reference signals. The CRC codes are then checked to determine whether the frames were successfully decoded. The data carried by the successfully decoded frames will then be provided to a data sink 272, which represents applications running in the AT 250 and/or various user interfaces (e.g., display). Control signals carried by successfully decoded frames will be provided to a controller/processor 290. When frames are unsuccessfully decoded, the controller/processor 290 may also use an acknowledgement (ACK) and/or negative acknowledgement (NACK) protocol to support retransmission requests for those frames.

In the uplink from the AT 250 to the AP 210, data from a data source 278 and control signals from the controller/processor 290 are provided. The data source 278 may represent applications running in the AT 250 and various user interfaces (e.g., keyboard). Similar to the functionality described in connection with the downlink transmission by the AP 210, the controller/processor 290 provides various signal processing functions including CRC codes, coding and interleaving to facilitate FEC, mapping to signal constellations, spreading with OVSFs, and scrambling to produce a series of symbols. Channel estimates, derived by the controller/processor 290 from a reference signal transmitted by the AP 210 or from feedback contained in a midamble transmitted by the AP 210, may be used to select the appropriate coding, modulation, spreading, and/or scrambling schemes. The symbols produced by the controller/processor 290 will be utilized to create a frame structure. The controller/processor 290 creates this frame structure by multiplexing the symbols with additional information, resulting in a series of frames. The frames are then provided to a transmitter 256, which provides various signal conditioning functions including amplification, filtering, and modulating the frames onto a carrier for uplink transmission over the wireless medium through the antennas 252A-252N.

The uplink transmission is processed at the AP 210 in a manner similar to that described in connection with the receiver function at the AT 250. A receiver 235 receives the uplink transmission through the antennas 234A-234N and processes the transmission to recover the information modulated onto the carrier. The information recovered by the receiver 235 is provided to the controller/processor 240, which parses each frame. The controller/processor 240 performs the inverse of the processing performed by the controller/processor 290 in the AT 250. The data and control signals carried by the successfully decoded frames may then be provided to a data sink 239. If some of the frames were unsuccessfully decoded by the receive processor, the controller/processor 240 may also use a positive acknowledgement (ACK) and/or negative acknowledgement (NACK) protocol to support retransmission requests for those frames.

The controller/processors 240 and 290 may be used to direct the operation at the AP 210 and the AT 250, respectively. For example, the controller/processors 240 and 290 may provide various functions including timing, peripheral interfaces, voltage regulation, power management, and other control functions. The computer readable media of memories 242 and 292 may store data and software for the AP 210 and the AT 250, respectively.

In accordance with various aspects of the disclosure, an element, or any portion of an element, or any combination of elements may be implemented with controller/processors 240 and 290 (e.g., that may each include one or more processors). The controller/processors 240 and 290 are responsible for general processing, including the execution of software stored in the memory 252 or 292. The software, when executed by the controller/processors 240 and 290, causes the controller/processors 240 and 290 to perform the various functions described below for any particular apparatus. The memory 252 or 292 may also be used for storing data that is manipulated by the controller/processors 240 and 290 when executing software.

In various aspects of the disclosure, an apparatus may be utilized in a wireless communication network, as a scheduling entity (e.g., the AP 210) and/or as a non-scheduling or subordinate entity (e.g., the AT 250). Also, in various aspects of the disclosure, an apparatus may employ peer-to-peer (P2P) wireless communication. For example, two or more P2P devices may cooperate to form a mesh wireless communication network. In any case, the apparatus may communicate with one or more wireless entities over an air interface. In any wireless communication network, channel conditions corresponding to the air interface will change over time.

Many networks accordingly use one or more rate control loops to dynamically adapt to the channel. For example, a transmitting device may configure one or more transmission parameters, including but not limited to a modulation and coding scheme (MCS), a transmission power, etc., to target a desired error rate at the receiving device. The receiving device that is receiving a packet-switched data stream typically checks the integrity of packets (e.g., using a cyclic redundancy check or CRC, a checksum, PHY layer channel coding pass/fail status, etc.) and may report back to the transmitting device using an acknowledgment or non-acknowledgment. This integrity check and reporting frequently, though not always, takes the form of an automatic repeat request (ARQ) and/or hybrid automatic repeat request (HARQ) algorithm. In other examples, any suitable algorithm or means of providing feedback information or response transmissions from the receiving device to the transmitting device may be used, such as reports relating to channel quality.

In some network designs, DMRS pilots have a fixed pattern in both time and frequency. This fixed pattern may lead to performance loss in the base station and the per-subframe channel estimate. In addition, there may be demodulation latency due to this fixed pilot structure.

The disclosure relates in some aspects to techniques for improved channel estimation. In a first example technique, a device (e.g., a base station) can specify a pilot structure where pilot density differs over time. For example, a device can adapt DMRS pilot density over time to facilitate earlier pilot processing and thereby improve the decoding timeline for channel estimation. This technique may thus be referred to colloquially as a "pilot bootstrap" technique. In a second example technique, a device can indicate that a pilot from a prior transmission time interval (TTI) can be used for channel estimation. Accordingly, devices may employ DMRS across-TTI bundling to improve channel estimation quality without significantly affecting the associated signaling overhead and/or processing overhead. In a third example technique, a device can employ frequency domain physical resource block (PRB) bundling. In a fourth example technique, a device can use an adjustable traffic-to-pilot ratio (TPR) for throughput optimization.

In some aspects, these techniques can facilitate extrapolation and decision-directed/iterative channel estimation at a device (e.g., an access terminal) that receives pilots, thereby improving decoding performance and reducing decoding latency. Accordingly, through the use of decision-directed and iterative channel estimations based on the teachings herein, such a device can improve its channel estimation accuracy and latency as compared to conventional schemes.

Each of the above four techniques will be described in turn with reference to FIGS. 3-7. For purposes of illustration, these figures may illustrate various components in the context of channel estimation for DMRS pilot systems and/or LTE technology. It should be appreciated, however, that the teachings herein may employ other types of devices and be implemented using other types of radio technologies and architectures. Also, various operations may be described as being performed by specific types of components (e.g., eNBs, base stations, client devices, peer-to-peer devices, UEs, and so on). It should be understood, however, that these operations can be performed by other types of devices. To reduce the complexity of these figures, only a few example components are shown. It should be appreciated, however, that the teachings herein can be implemented using a different number of components or other types of components.

Pilot Structure

The disclosure relates in some aspects to a pilot structure where the density of pilots may vary over time.

Figure 3:
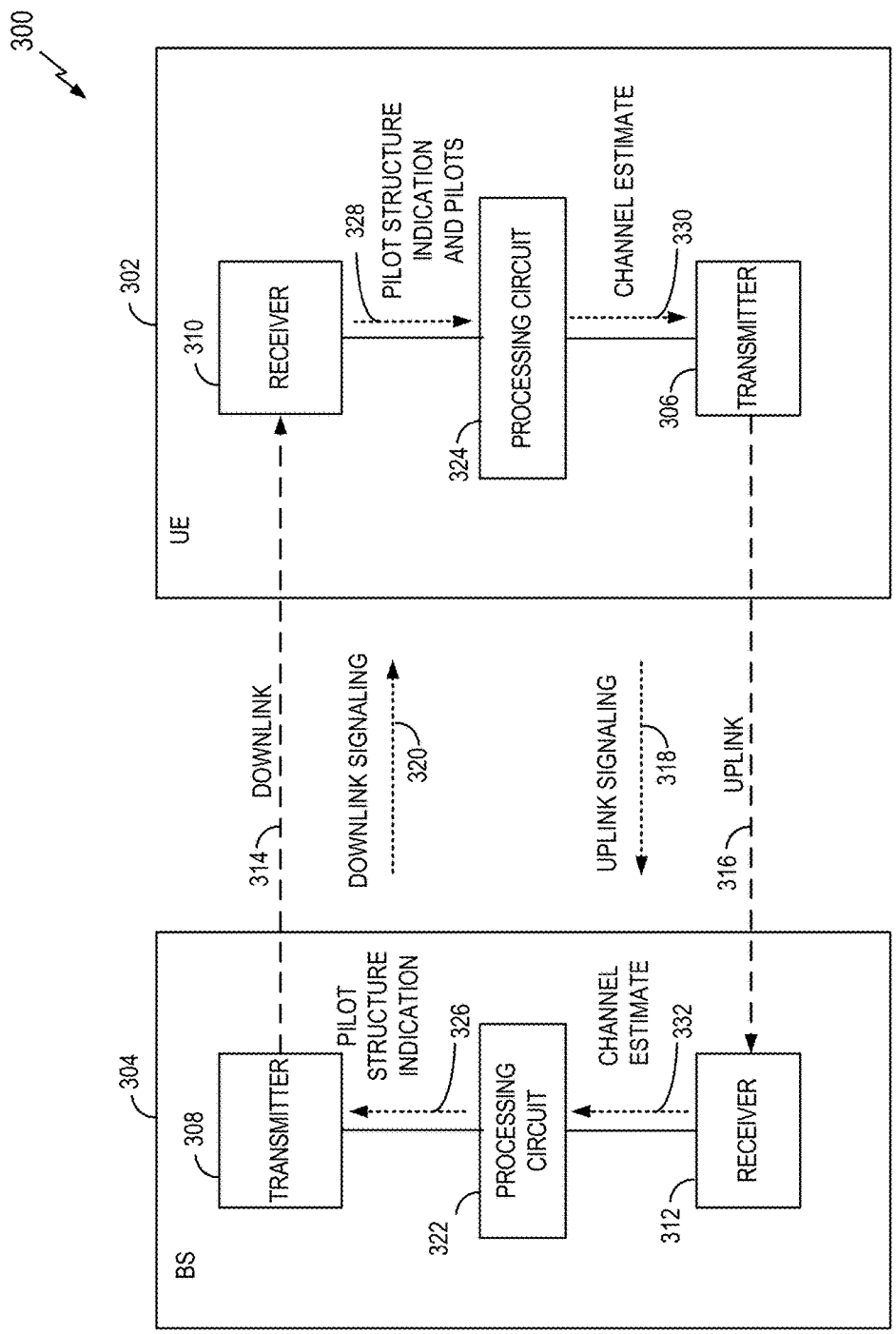
FIG. 3 is a block diagram illustrating an example of a communication system where a base station (BS) signals a pilot structure to a UE in accordance with some aspects of the disclosure.

FIG. 3 illustrates a communication system 300 where a base station (BS) 304 (e.g., an eNB) communicates pilot structure information and other information to a UE 302 in accordance with the teachings herein. In the communication system 300, the UE 302 is served by the base station 304. In some aspects, the UE 302 may correspond to the AT 250 of FIG. 2, or any of the ATs 130, 132, 134, 136, 138, or 140 of FIG. 1. In some aspects, the base station 304 may correspond to the AP 210 of FIG. 2, or any of the APs 142, 144, or 146 of FIG. 1. The UE 302 and the base station 304 include respective transmitters 306 and 308 and receivers 310 and 312 for supporting communicating via a downlink (DL) 314 and an uplink (UL) 316 as indicated. That is, the UE 302 transmits UL signaling 318 to the base station 304 and the base station transmits DL signaling 320 to the UE 302.

As mentioned above, it should be noted that the discussions of aspects of the technology discussed in this disclosure relative to base stations and UEs are for purposes of explanation. In other scenarios, the disclosed base stations and UEs could instead be other types of components/devices capable of wireless communication. For example, the teachings here may be applied among a wireless user device and a wireless network device, among multiple wireless user devices, or among multiple wireless network devices.

Figure 4:
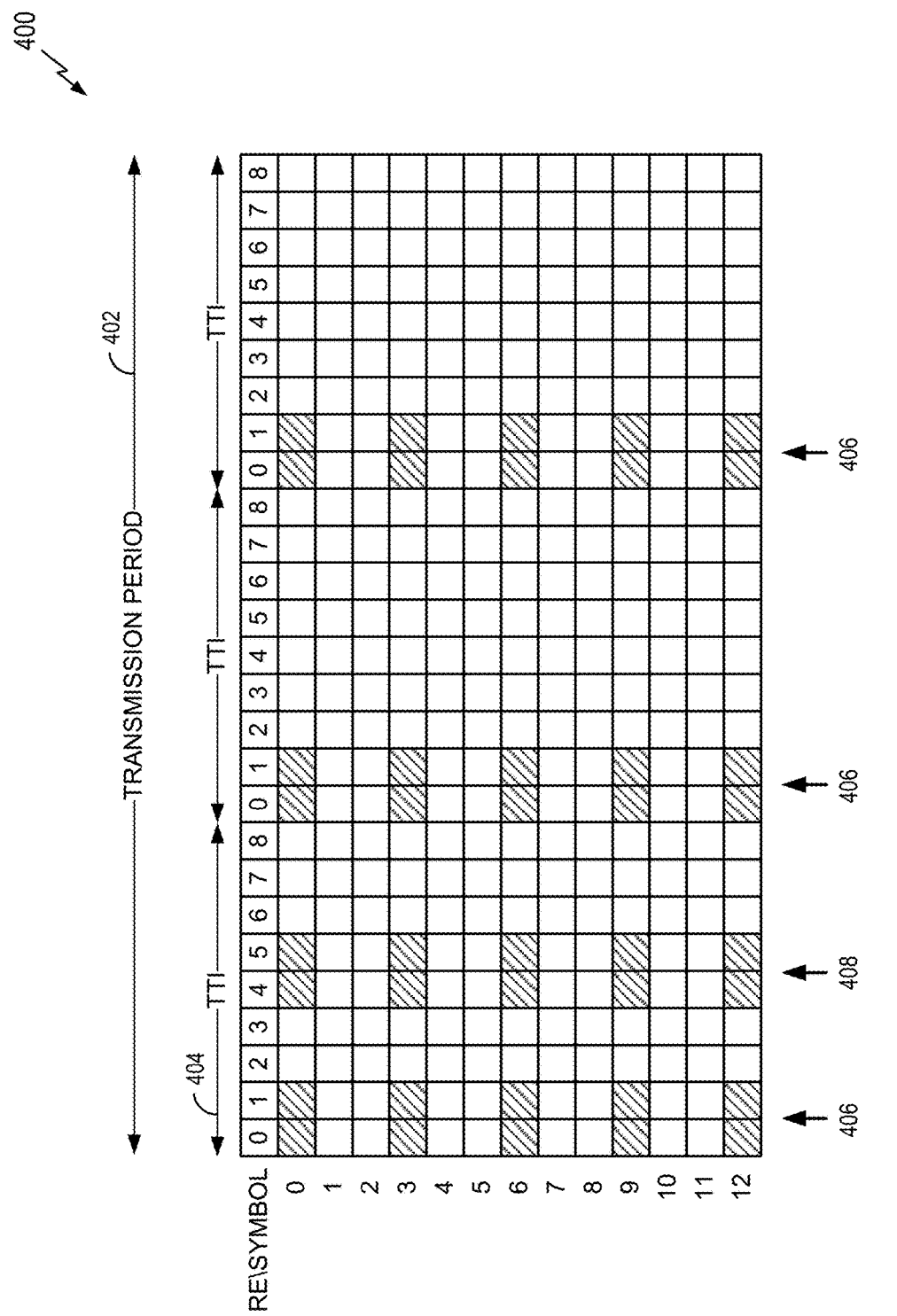
FIG. 4 illustrates an example of a pilot structure in accordance with some aspects of the disclosure.

A pilot structure 400 of FIG. 4 shown symbols in the time domain (x-axis) and the frequency domain (y-axis). A transmission period 402 includes multiple TTIs (e.g., a first TTI 404). In some aspects, the transmission period 402 may correspond to a data burst. Also, while three TTIs are shown in FIG. 1 for purposes of illustration, a transmission period could include a different number of TTIs.

Pilot symbols 406 (represented by shaded boxes) are defined at the beginning of each TTI. In some aspects, this facilitates early detection of the pilot symbols in each TTI.

In addition, extra pilot symbols 408 (represented by shaded boxes) are provided in the first TTI at symbols 4 and 5. Extra pilot symbols could be provided at other symbols in other implementations (e.g., in addition to or other than the pilot symbols at symbols 4 and 5). The use of extra symbols can increase the pilot density (e.g., at the beginning of a data burst). For example, upon a cold start or a beamforming (BF) change, a base station can signal a UE to schedule denser pilots, thereby bootstrapping the UE's channel estimation. The UE receives the pilots earlier and can therefore generate a channel estimate sooner. In addition, the UE can receive more pilot information earlier and therefore generate a more accurate estimate earlier. The UE gets notified of extra pilot symbols in this case via indicator bits in the control channel payload. Accordingly, the UE's channel estimation process is assisted (colloquially referred to as bootstrapping) by providing the UE with earlier pilots, etc.

Pilot density can be increased in terms of at least one of time, frequency, or transmit power. For example, more pilots can be sent in some TTIs than other TTIs. As another example, additional pilots (e.g., early pilots) can be transmitted on additional frequency bands (e.g., concurrently or at different times). As yet another example, the transmit power can be higher for some pilots (e.g., earlier pilots) than others.

Referring again to FIG. 3, based on one or more criterion, a processing circuit 322 of the base station 304 generates a pilot structure and transmits an indication of the pilot structure 326 to the UE 302. The base station 304 may also transmit an indication of whether prior TTIs can be used for decoding, PMIs for PRB bundling, and TPR indications as discussed below. At some point in time, the base station 304 also transmits pilots to the UE 302 according to the pilot structure.

A processing circuit 324 of the UE 302 uses a received pilot structure (derived from the received pilot structure indication and pilots 328) to receive pilots from the base station 304. The processing circuit 324 also generates a channel estimate 330 based on received pilots (from the received pilot structure indication and pilots 328) and decodes (e.g., demodulates) received data based on the channel estimate. The UE 302 also may send the channel estimate 330 or parameters derived from the channel estimate to the base station 304 to enable the base station 304 to adapt communication parameters based on a received channel estimate 332.

As discussed herein, through the use of the dynamic pilot structure as taught herein, the UE 302 may advantageously generate more accurate channel estimates and mitigate associated delays. For example, by receiving pilots front-loaded into a transmission period, the UE 302 can generate a channel estimate more quickly and/or more accurately. Also, by receiving pilots prior to the end of a TTI, the UE 302 can generate a channel estimate on-the-fly (e.g., as compared to LTE where the pilot is at the end of the TTI). Furthermore, periodic pilot updates can be received and used to improve the channel estimation.

TTI Pilot Filtering

The disclosure relates in some aspects to using a pilot from a previous TTI for channel estimation. For example, a base station can signal a UE to utilize pilots in the previous TTI to improve channel estimation quality and the decoding timeline. This technique can be used, for example, in cases where the TTI has not changed (e.g., in cases where beamforming has not changed between TTIs).

Figure 5:
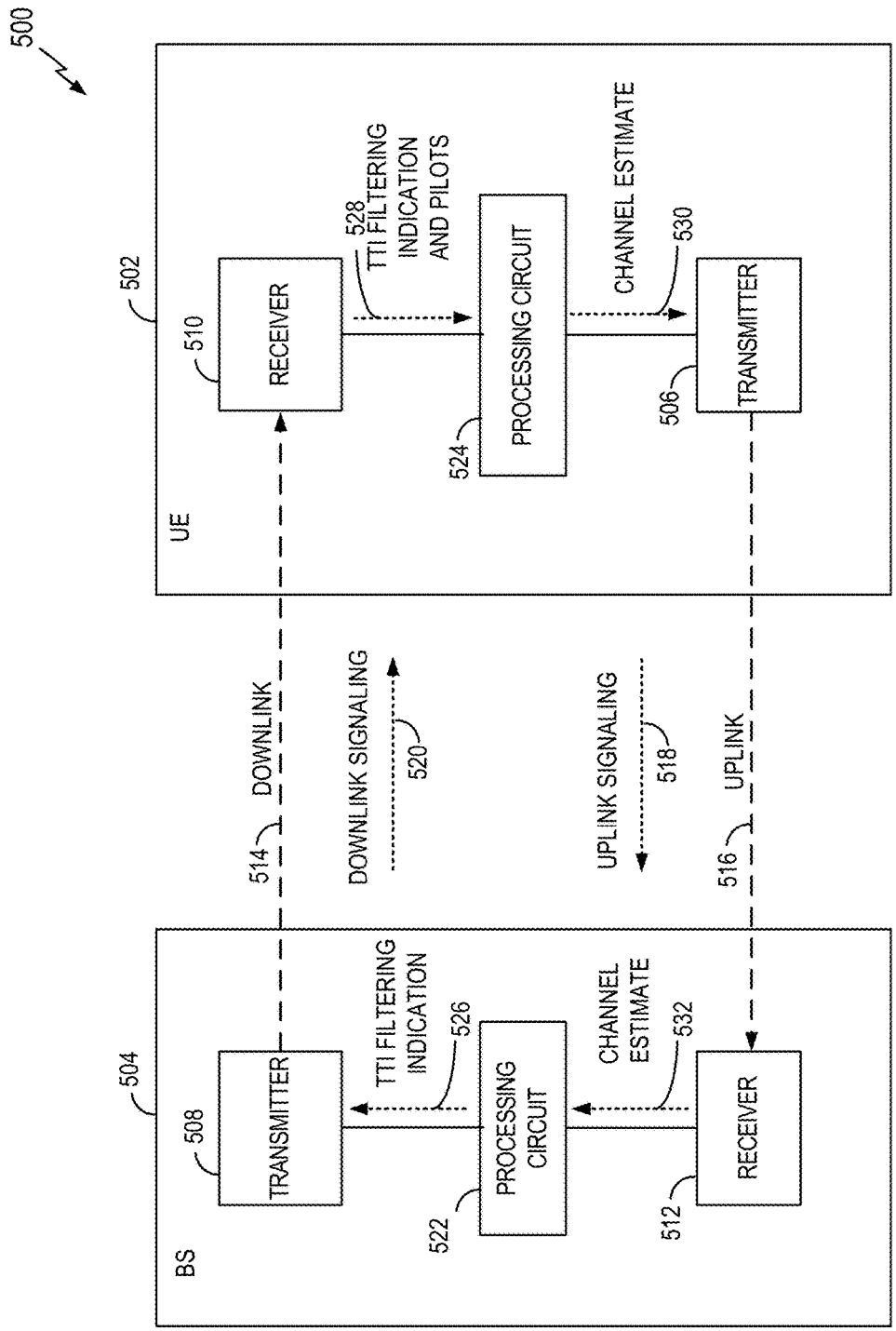
FIG. 5 is a block diagram illustrating another example of a communication system where a base station (BS) signals an indication of TTI filtering to a UE in accordance with some aspects of the disclosure.

FIG. 5 illustrates a communication system 500 where a base station (BS) 504 communicates pilot information and other information as taught herein to a UE 502 in accordance with the teachings herein. In the communication system 500, the UE 502 is served by the base station 504. In some aspects, the UE 502 may correspond to the AT 250 of FIG. 2, or any of the ATs 130, 132, 134, 136, 138, or 140 of FIG. 1. In some aspects, the base station 504 may correspond to the AP 210 of FIG. 2, or any of the APs 142, 144, or 146 of FIG. 1. The UE 502 and the base station 504 include respective transmitters 506 and 508 and receivers 510 and 512 for supporting communicating via a downlink (DL) 514 and an uplink (UL) 516 as indicated. That is, the UE 502 transmits UL signaling 518 to the base station 504 and the base station transmits DL signaling 520 to the UE 502.

A processing circuit 522 of the base station 504 generates a TTI filtering indication 526 that indicates whether pilots from prior TTIs can be used for channel estimation for the current TTI. The base station 504 transmits this indication to the UE 502. In addition, at some point in time, the base station 504 transmits pilots to the UE 502 according to the current pilot structure.

A processing circuit 524 of the UE 502 receives the TTI filtering indication and pilots 528 and generates a channel estimate 530 based on the received pilots and the indicated filtering technique indicated. Thus, in some cases, the processing circuit 524 generates the channel estimate 530 based on pilots from a current TTI and pilots from earlier TTIs. In some aspects, the processing circuit 524 may decode (e.g., demodulate) received data based on the channel estimate. The UE 502 also sends the channel estimate to the base station 504 to enable the processing circuit 522 of the base station 504 to adapt communication parameters based on a received channel estimate 532.

Through the use of the dynamic pilot techniques taught herein, the UE 502 may advantageously generate more accurate channel estimates and mitigate associated delays. For example, by receiving pilots from prior TTIs, the accuracy of the channel estimation or the channel estimation time may be improved.

PRB Bundling

The disclosure relates in some aspects to enhanced frequency domain pilot bundling. In some aspects, this involves PRB bundling. Uniform pilot spacing can be employed in a bundled PRB region to enable better channel estimation. Wider-band bundling can be employed to tradeoff channel estimation performance for sub-band (SB) scheduling flexibility and/or beamforming (BF) gain.

Wideband bundling in the presence of precoding change can be employed to improve channel estimation quality. For example, a base station can transmit signals to indicate a precoding matrix indicator (PMI) change across PRB bundles to enable joint wideband (WB) channel estimation across multiple PRB bundles. In some implementations, a base station signals the difference between neighbor resource block (RB) PMIs. In some implementations, a base station performs wideband beamforming based on a sounding reference signal (SRS) and sub-band fine tuning based on channel state feedback (CSF). UE-PMI can also be used to adjust precoder differences across PRBs. For example, UE reported sub-band PMI can be guaranteed to be applied N subframes later.

Figure 6:
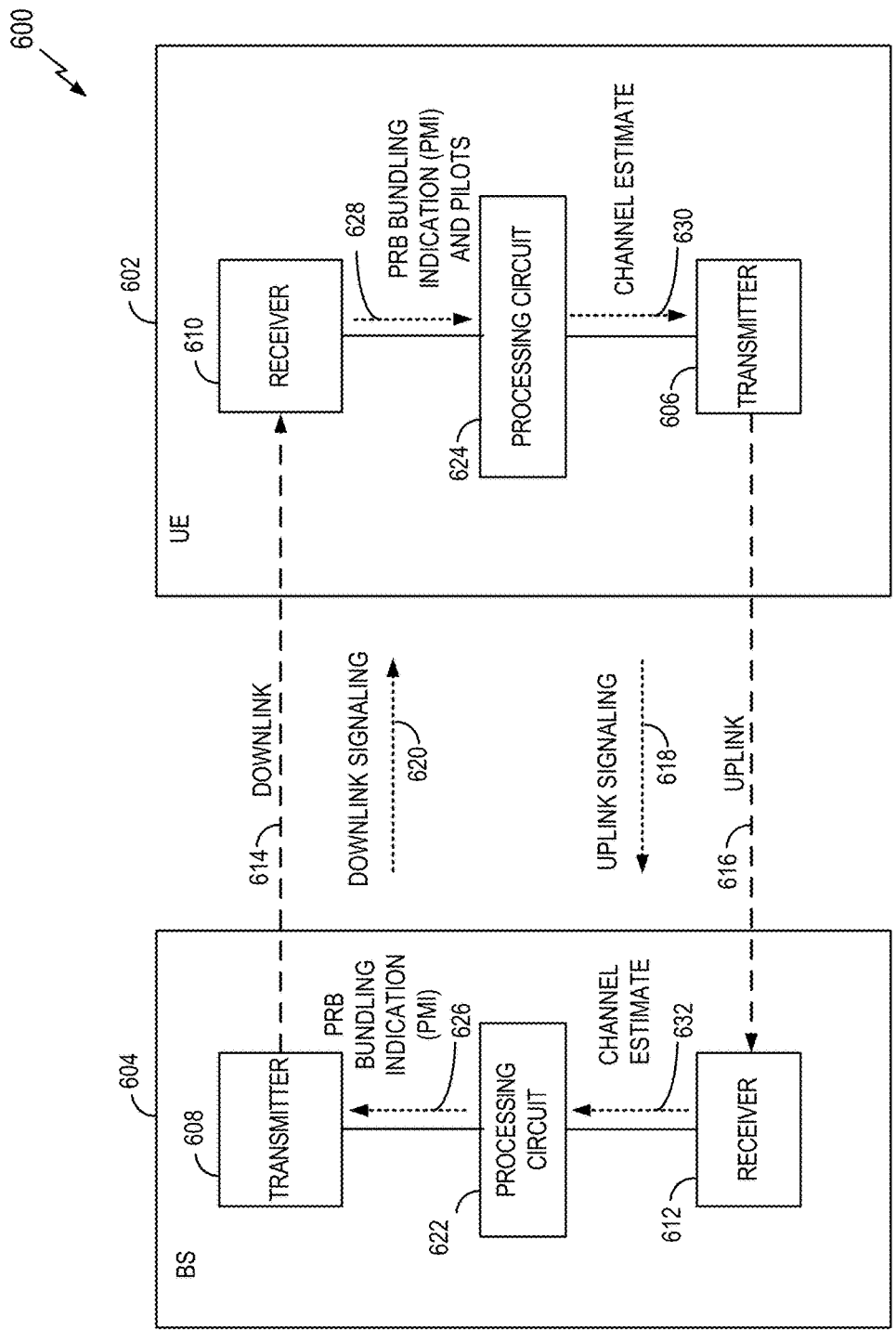
FIG. 6 is a block diagram illustrating another example of a communication system where a base station (BS) signals an indication of physical resource block (PRB) bundling to a UE in accordance with some aspects of the disclosure.

FIG. 6 illustrates a communication system 600 where a base station (BS) 604 communicates pilot information and other information as taught herein to a UE 602 in accordance with the teachings herein. In the communication system 600, the UE 602 is served by the base station 604. In some aspects, the UE 602 may correspond to the AT 250 of FIG. 2, or any of the ATs 130, 132, 134, 136, 138, or 140 of FIG. 1. In some aspects, the base station 604 may correspond to the AP 210 of FIG. 2, or any of the APs 142, 144, or 146 of FIG. 1. The UE 602 and the base station 604 include respective transmitters 606 and 608 and receivers 610 and 612 for supporting communicating via a downlink (DL) 614 and an uplink (UL) 616 as indicated. That is, the UE 602 transmits UL signaling 618 to the base station 604 and the base station transmits DL signaling 620 to the UE 602.

A processing circuit 622 of the base station 604 generates a PRB bundling indication 626 (e.g., a PMI applied across different PRBs) that indicates, for example, how PRBs may be bundled. The base station 604 transmits this indication to the UE 602. In addition, at some point in time, the base station 604 transmits pilots to the UE 602 according to the current pilot structure.

A processing circuit 624 of the UE 602 receives the PRB bundling indication and pilots 628 and generates a channel estimate 630 based on the received pilots and the indicated PRB bundling scheme. The processing circuit 624 may also decode (e.g., demodulate) received data based on the channel estimate. The UE 602 sends the channel estimate (or parameters derived from the channel estimate) to the base station 604 to enable the processing circuit 622 of the base station 604 to adapt communication parameters based on a received channel estimate 632.

Through the use of the dynamic pilot techniques taught herein, the UE 602 may advantageously generate more accurate channel estimates and mitigate associated delays. For example, by receiving pilots that are uniform across a PRB bundle, the UE 602 can generate a more accurate channel estimate (e.g., for a wideband channel).

TPR Adjustment

The disclosure relates in some aspects to power optimization for a DMRS pilot. In some aspects, flexible traffic-to-pilot ratio (TPR) adjustment can be employed to optimize DMRS traffic performance. For example, DMRS power can be optimized for different MCSs, ranks, rates, and so on. To this end, a first device (e.g., a base station) may signal a TPR to neighbor devices (e.g., UEs) for joint demodulation.

Figure 7:
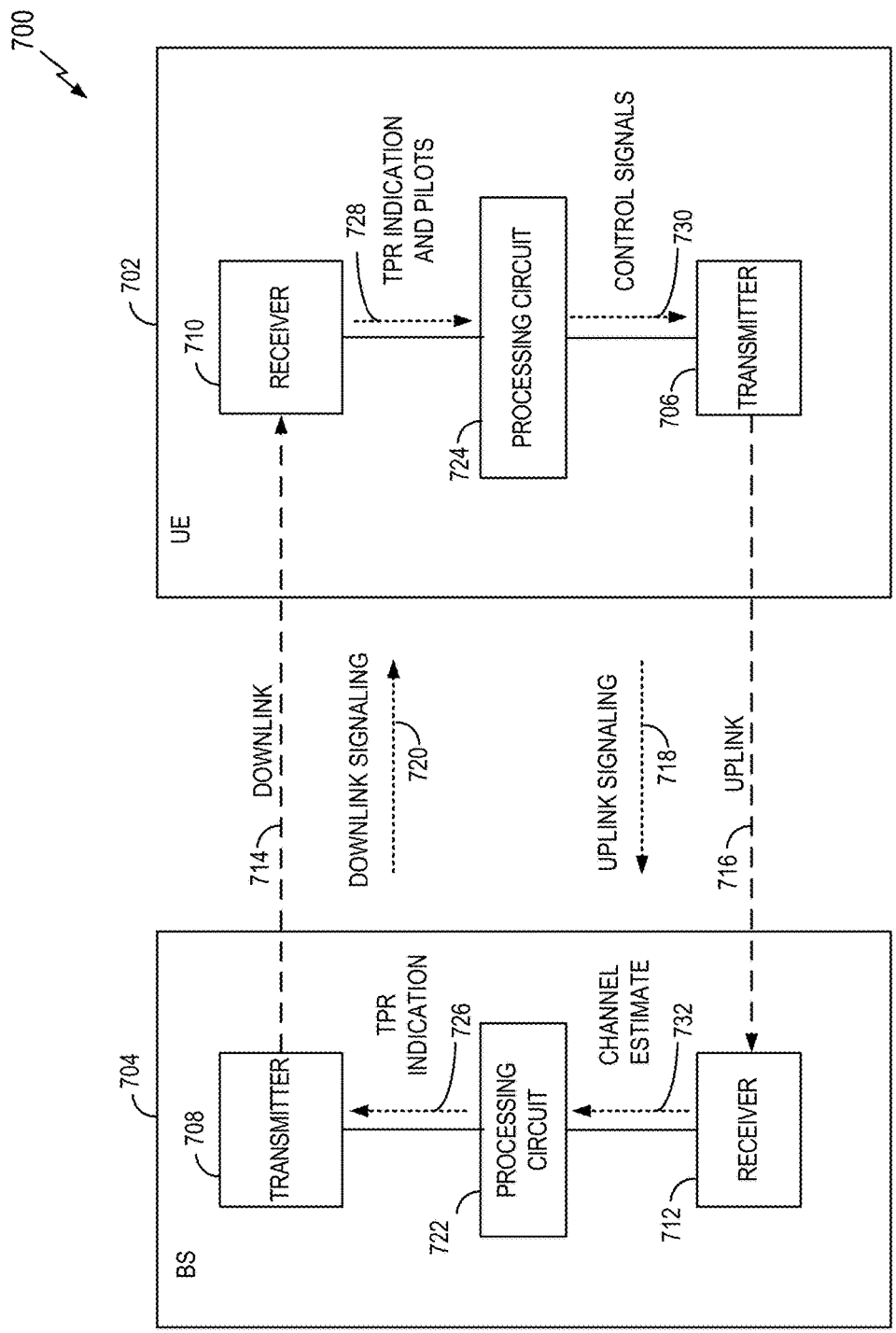
FIG. 7 is a block diagram illustrating another example of a communication system where a base station (BS) an indication of a traffic-to-pilot ratio (TPR) to a UE in accordance with some aspects of the disclosure.

FIG. 7 illustrates a communication system 700 where a base station (BS) 704 communicates pilot information and other information as taught herein to a UE 702 in accordance with the teachings herein. In the communication system 700, the UE 702 is served by the base station 704. In some aspects, the UE 702 may correspond to the AT 250 of FIG. 2, or any of the ATs 130, 132, 134, 136, 138, or 140 of FIG. 1. In some aspects, the base station 704 may correspond to the AP 210 of FIG. 2, or any of the APs 142, 144, or 146 of FIG. 1. The UE 702 and the base station 704 include respective transmitters 706 and 708 and receivers 710 and 712 for supporting communicating via a downlink (DL) 714 and an uplink (UL) 716 as indicated. That is, the UE 702 transmits UL signaling 718 to the base station 704 and the base station transmits DL signaling 720 to the UE 702.

At some point in time, a processing circuit 722 of the base station 704 sends a TPR indication 726 to the UE 702 (e.g., by sending an appropriate signal to the UE via the downlink signaling 720). A processing circuit 724 of the UE 702 generates control signals 730 to control the transmit power of the transmitter 706 based on received TPR indications (from the received TPR indication and pilots 728).

The processing circuit 724 also generates a channel estimate (not shown) based on received pilots (from the received TPR indications and pilots 728). The transmitter 706 transmits this channel estimate (or parameters derived from the channel estimate) to the receiver 712 via the uplink 716. Accordingly, the processing circuit 722 of the base station 704 can adjust communication parameters based on a received channel estimate 732.

As discussed herein, through the use of the TPR indications, the UE 702 may advantageously generate more accurate channel estimates and mitigate associated delays. For example, the UE 702 can dynamically set its transmit power accordingly to TPR information received from the base station 704. Thus different TPRs may be used for different transmission schemes (e.g., for different MCSs, different ranks, etc.).

The functionality disclosed in two or more of FIG. 3, 5, 6, or 7 may be combined in some implementations. For example, a base station could include the functionality of two or more of the base station 304, the base station 504, the base station 604, or the base station 704. As another example, a UE could include the functionality of two or more of the UE 302, the UE 502, the UE 602, or the UE 702.

Example Apparatus

Figure 8:
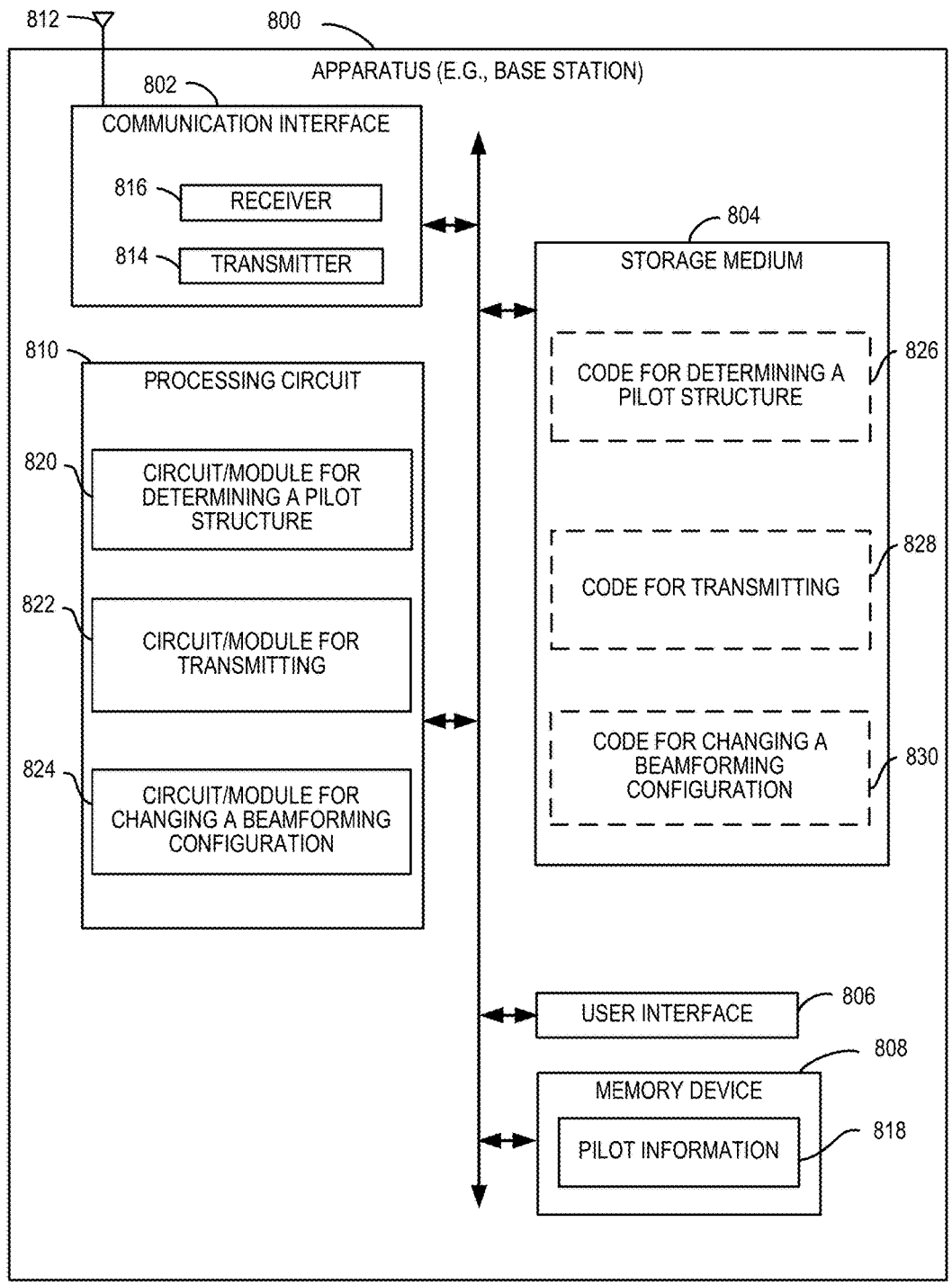
FIG. 8 is a block diagram illustrating an example hardware implementation for an apparatus (e.g., an electronic device) that can execute one or more of the methods for supporting communication in accordance with some aspects of the disclosure.

FIG. 8 illustrates a block diagram of an example hardware implementation of an apparatus 800 configured to communicate according to one or more aspects of the disclosure. For example, the apparatus 800 could embody or be implemented within a base station (e.g., an eNB), a UE, or some other type of device that supports wireless communication. In various implementations, the apparatus 800 could embody or be implemented within an access terminal, an access point, or some other type of device. In various implementations, the apparatus 800 could embody or be implemented within a mobile phone, a smart phone, a tablet, a portable computer, a server, a personal computer, a sensor, an entertainment device, a vehicular component, medical devices, or any other electronic device having circuitry.

The apparatus 800 includes a communication interface (e.g., at least one transceiver) 802, a storage medium 804, a user interface 806, a memory device (e.g., a memory circuit) 808, and a processing circuit (e.g., at least one processor) 810. In various implementations, the user interface 806 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 8. The signaling bus may include any number of interconnecting buses and bridges depending on the specific application of the processing circuit 810 and the overall design constraints. The signaling bus links together various circuits such that each of the communication interface 802, the storage medium 804, the user interface 806, and the memory device 808 are coupled to and/or in electrical communication with the processing circuit 810. The signaling bus may also link various other circuits (not shown) such as timing sources, peripherals, voltage regulators, and power management circuits, which are well known in the art, and therefore, will not be described any further.

The communication interface 802 provides a means for communicating with other apparatuses over a transmission medium. In some implementations, the communication interface 802 includes circuitry and/or programming adapted to facilitate the communication of information bi-directionally with respect to one or more communication devices in a network. In some implementations, the communication interface 802 is adapted to facilitate wireless communication of the apparatus 800. In these implementations, the communication interface 802 may be coupled to one or more antennas 812 as shown in FIG. 8 for wireless communication within a wireless communication system. The communication interface 802 can be configured with one or more standalone receivers and/or transmitters, as well as one or more transceivers. In the illustrated example, the communication interface 802 includes a transmitter 814 and a receiver 816. The communication interface 802 serves as one example of a means for receiving and/or means transmitting.

The memory device 808 may represent one or more memory devices. As indicated, the memory device 808 may maintain pilot-related information 818 along with other information used by the apparatus 800. In some implementations, the memory device 808 and the storage medium 804 are implemented as a common memory component. The memory device 808 may also be used for storing data that is manipulated by the processing circuit 810 or some other component of the apparatus 800.

The storage medium 804 may represent one or more computer-readable, machine-readable, and/or processor-readable devices for storing programming, such as processor executable code or instructions (e.g., software, firmware), electronic data, databases, or other digital information. The storage medium 804 may also be used for storing data that is manipulated by the processing circuit 810 when executing programming. The storage medium 804 may be any available media that can be accessed by a general purpose or special purpose processor, including portable or fixed storage devices, optical storage devices, and various other mediums capable of storing, containing or carrying programming.

By way of example and not limitation, the storage medium 804 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 804 may be embodied in an article of manufacture (e.g., a computer program product). By way of example, a computer program product may include a computer-readable medium in packaging materials. In view of the above, in some implementations, the storage medium 804 may be a non-transitory (e.g., tangible) storage medium.

The storage medium 804 may be coupled to the processing circuit 810 such that the processing circuit 810 can read information from, and write information to, the storage medium 804. That is, the storage medium 804 can be coupled to the processing circuit 810 so that the storage medium 804 is at least accessible by the processing circuit 810, including examples where at least one storage medium is integral to the processing circuit 810 and/or examples where at least one storage medium is separate from the processing circuit 810 (e.g., resident in the apparatus 800, external to the apparatus 800, distributed across multiple entities, etc.).

Programming stored by the storage medium 804, when executed by the processing circuit 810, causes the processing circuit 810 to perform one or more of the various functions and/or process operations described herein. For example, the storage medium 804 may include operations configured for regulating operations at one or more hardware blocks of the processing circuit 810, as well as to utilize the communication interface 802 for wireless communication utilizing their respective communication protocols.

The processing circuit 810 is generally adapted for processing, including the execution of such programming stored on the storage medium 804. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 810 is arranged to obtain, process and/or send data, control data access and storage, issue commands, and control other desired operations. The processing circuit 810 may include circuitry configured to implement desired programming provided by appropriate media in at least one example. For example, the processing circuit 810 may be implemented as one or more processors, one or more controllers, and/or other structure configured to execute executable programming. Examples of the processing circuit 810 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 810 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 810 are for illustration and other suitable configurations within the scope of the disclosure are also contemplated.

According to one or more aspects of the disclosure, the processing circuit 810 may be adapted to perform any or all of the features, processes, functions, operations and/or routines for any or all of the apparatuses described herein. For example, the processing circuit 810 may be configured to perform any of the steps, functions, and/or processes described with respect to FIGS. 1-7 and 9-10. As used herein, the term "adapted" in relation to the processing circuit 810 may refer to the processing circuit 810 being one or more of configured, employed, implemented, and/or programmed to perform a particular process, function, operation and/or routine according to various features described herein.

The processing circuit 810 may be a specialized processor, such as an application specific integrated circuit (ASIC) that serves as a means for (e.g., structure for) carrying out any one of the operations described in conjunction with FIGS. 1-7 and 9-10. The processing circuit 810 serves as one example of a means for transmitting and/or a means for receiving. In some implementations, the processing circuit 810 incorporates the functionality of the processing circuit 322 of FIG. 3.

According to at least one example of the apparatus 800, the processing circuit 810 may include one or more of a circuit/module for determining a pilot structure 820, a circuit/module for transmitting 822, or a circuit/module for changing a beamforming configuration 824. In some implementations, the circuit/module for determining a pilot structure 820, the circuit/module for transmitting 822, and the circuit/module for changing a beamforming configuration 824 correspond, at least in part, to the processing circuit 322 of FIG. 3.

The circuit/module for determining a pilot structure 820 may include circuitry and/or programming (e.g., code for determining a pilot structure 826 stored on the storage medium 804) adapted to perform several functions relating to, for example, determining a pilot structure where pilot density differs over time within a transmission period. In some implementations, the circuit/module for determining a pilot structure 820 defines the pilot structure. For example, the circuit/module for determining a pilot structure 820 may define a pilot structure where the pilot density is higher at a beginning of the transmission period (e.g., the pilot density at a beginning portion of the transmission period is higher than the pilot density at a later portion of the transmission period). As another example, the circuit/module for determining a pilot structure 820 may define a pilot structure where the pilot density is different for different transmission time intervals (TTIs) within the transmission period. In some aspects, the pilot density further differs with respect to frequency during the transmission period and/or with respect to transmit power during the transmission period. In some implementations, the circuit/module for determining a pilot structure 820 obtains the pilot structure. For example, the circuit/module for determining a pilot structure 820 may obtain pilot structure information from a component of the apparatus (e.g., the memory device 808, the receiver 816, or some other component) or directly from a device (e.g., a base station, a user device, etc.) that broadcasts this information. The circuit/module for determining a pilot structure 820 outputs the determined pilot structure information (e.g., stores the information in the memory device 808 or sends the information to another component of the apparatus 800). In some implementations, the communication interface 802 includes the circuit/module for determining a pilot structure 820 and/or the code for determining a pilot structure 826.

The circuit/module for transmitting 822 may include circuitry and/or programming (e.g., code for transmitting 828 stored on the storage medium 804) adapted to perform several functions relating to, for example, transmitting an indication or other information. In some implementations, the circuit/module for transmitting 822 is configured to transmit an indication of pilot structure. Initially, the circuit/module for transmitting 822 obtains data to be transmitted. For example, the circuit/module for transmitting 822 may obtain this data from a component of the apparatus (e.g., the memory device 808, the circuit/module for determining a pilot structure 820, or some other component). In some implementations, the circuit/module for transmitting 822 processes (e.g., encodes) the data to be transmitted. The circuit/module for transmitting 822 then causes the data to be transmitted. For example, the circuit/module for transmitting 822 can pass the data to the transmitter 814 for subsequent radio frequency (RF) transmission. In some implementations, the transmitter 814 includes the circuit/module for transmitting 822 and/or the code for transmitting 828.

The circuit/module for changing a beamforming configuration 824 may include circuitry and/or programming (e.g., code for changing a beamforming configuration 830 stored on the storage medium 804) adapted to perform several functions relating to, for example, changing a beamforming configuration used by the communication interface 802. Initially, the circuit/module for changing a beamforming configuration 824 receives an indication that a beamforming configuration is to be changed. In addition, the circuit/module for changing a beamforming configuration 824 obtains parameters (e.g., from the memory device 808, the communication interface 802, or some other component) for the new beamforming configuration. These parameters may include, for example, an amplitude value and a phase value for each antenna subject to configuration. The circuit/module for changing a beamforming configuration 824 then generates, based on the obtained parameters, at least one control signal that controls at least one component (e.g., an amplifier and/or a phase shifter) of the transmitter 814 and/or the receiver 816 to provide the desired beamforming when the transmitter 814 transmits radio frequency (RF) signals and/or the receiver 816 receives RF signals.

As mentioned above, programming stored by the storage medium 804, when executed by the processing circuit 810, causes the processing circuit 810 to perform one or more of the various functions and/or process operations described herein. For example, the programming, when executed by the processing circuit 810, may cause the processing circuit 810 to perform the various functions, steps, and/or processes described herein with respect to FIGS. 1-7 and 9-10 in various implementations. As shown in FIG. 8, the storage medium 804 may include one or more of the code for determining a pilot structure 826, the code for transmitting 828, or the code for changing a beamforming configuration 830.

Example Processes

Figure 9:
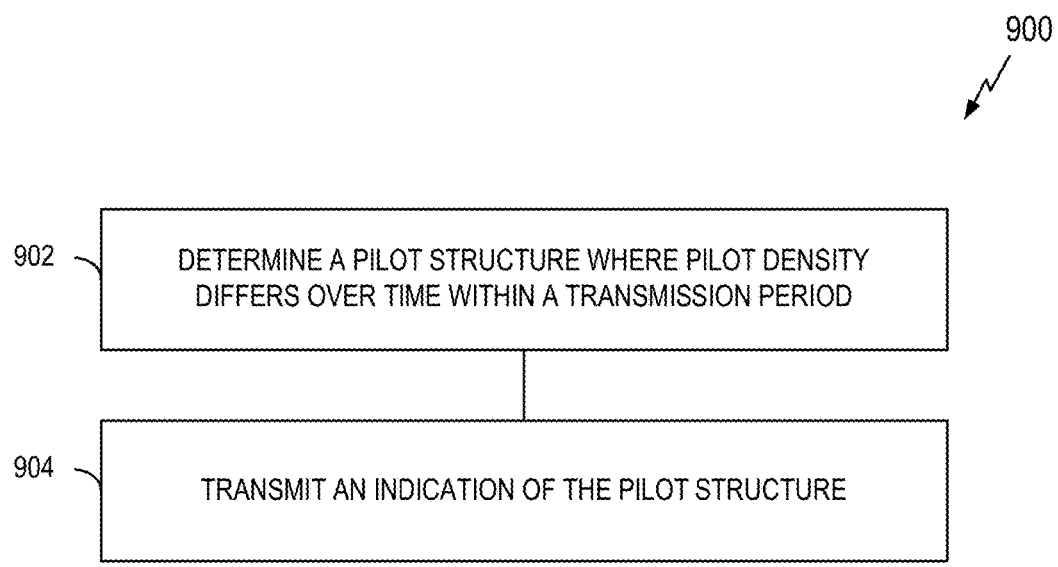
FIG. 9 is a flowchart illustrating an example of a process for communication in accordance with some aspects of the disclosure.

FIG. 9 illustrates a process 900 for communication in accordance with some aspects of the disclosure. The process 900 may take place within a processing circuit (e.g., the processing circuit 810 of FIG. 8), which may be located in a base station, an access terminal, or some other suitable apparatus (device). In some implementations, the process 900 represents operations performed by the processing circuit 322 of FIG. 3. Of course, in various aspects within the scope of the disclosure, the process 900 may be implemented by any suitable apparatus capable of supporting communication-related operations.

At block 902, an apparatus (e.g., a base station) determines a pilot structure where pilot density differs over time within a transmission period. Thus, such a pilot structure could be used for advanced channel estimation (pilot bootstrapping) as discussed herein.

In some aspects, the transmission period may correspond to a traffic burst. In some aspects, the pilot structure may be for a demodulation reference signal (DMRS).

In some aspects, the pilot density relates to at least one of: time, frequency, or transmit power. For example, in some aspects, the pilot density may differ with respect to transmit power during the transmission period. As another example, in some aspects, the pilot density may differ with respect to frequency during the transmission period.

In some aspects, pilots in the pilot structure may be located at a beginning portion and/or a middle portion of a transmission time interval (TTI). In some aspects, the pilot density may be higher at a beginning of the transmission period (e.g., the pilot density at a beginning portion of the transmission period is higher than the pilot density at a later portion of the transmission period). In some aspects, the pilot density may be different for different transmission time intervals (TTIs) within the transmission period.

In some implementations, the circuit/module for determining a pilot structure 820 of FIG. 8 performs the operations of block 902. In some implementations, the code for determining a pilot structure 826 of FIG. 8 is executed to perform the operations of block 902.

At block 904, the apparatus transmits an indication of the pilot structure. For example, upon establishing communication (or changing beamforming) with a UE, an eNB may transmit this indication (e.g., by broadcasting the indication or by unicasting the indication to a UE). Thus, in some aspects, the process 900 may involve changing a beamforming configuration, wherein the pilot structure is defined as a result of the change in (the changing of) the beamforming configuration.

In some implementations, the circuit/module for transmitting 822 of FIG. 8 performs the operations of block 904. In some implementations, the code for transmitting 828 of FIG. 8 is executed to perform the operations of block 904.

Figure 10:
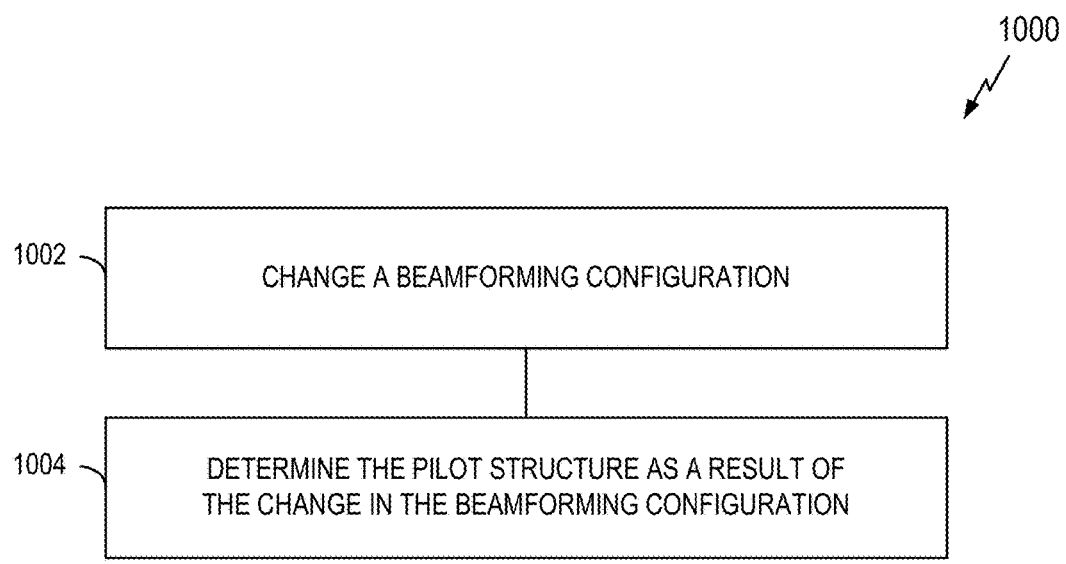
FIG. 10 is a flowchart illustrating an example of a process involving determining a pilot structure in accordance with some aspects of the disclosure.

FIG. 10 illustrates a process 1000 for communication in accordance with some aspects of the disclosure. In some aspects, the process 1000 may be implemented in conjunction with the process 900 of FIG. 9. For example, the process 1000 may be, at least in part, a trigger for block 902. The process 1000 may take place within a processing circuit (e.g., the processing circuit 810 of FIG. 8), which may be located in a base station, an access terminal, or some other suitable apparatus (device). In some implementations, the process 1000 represents operations performed by the processing circuit 322 of FIG. 3. Of course, in various aspects within the scope of the disclosure, the process 1000 may be implemented by any suitable apparatus capable of supporting communication operations.

At block 1002, an apparatus (e.g., a base station) changes a beamforming configuration. For example, this change may be due to a change in channel conditions, movement of the apparatus and/or an associated apparatus, an obstruction, or some other condition.

In some implementations, the circuit/module for changing a beamforming configuration 824 of FIG. 8 performs the operations of block 1002. In some implementations, the code for changing a beamforming configuration 830 of FIG. 8 is executed to perform the operations of block 1002.

At block 1004, the apparatus defines a pilot structure (e.g., as in block 902 above) as a result of the change in (the changing of) the beamforming structure at block 1002. For example, a specific pilot structure may be indicated for a certain beamforming configuration in an attempt to provide the best communication quality possible.

In some implementations, the circuit/module for determining a pilot structure 820 of FIG. 8 performs the operations of block 1004. In some implementations, the code for determining a pilot structure 826 of FIG. 8 is executed to perform the operations of block 1004.

Example Apparatus

Figure 11:
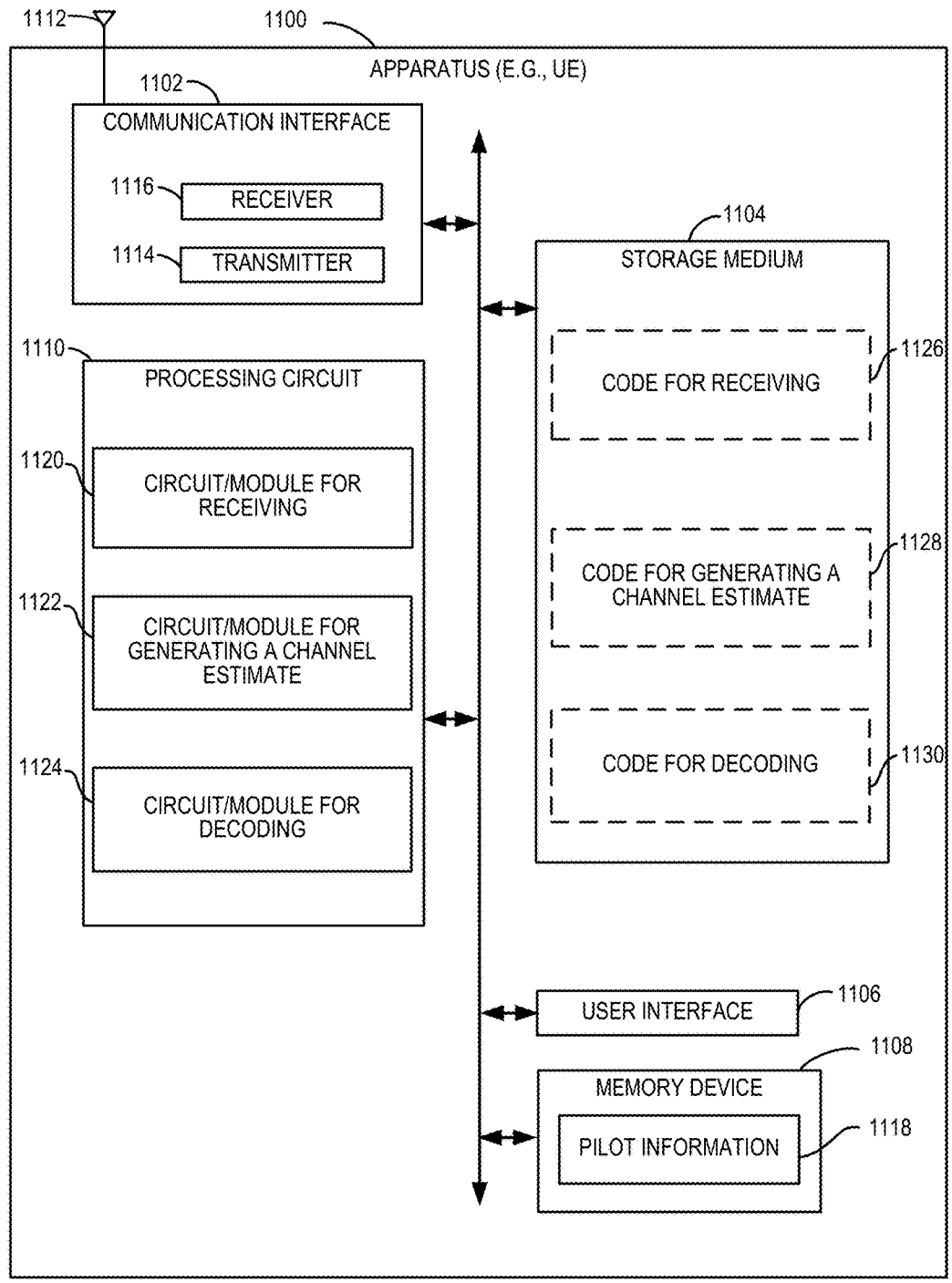
FIG. 11 is a block diagram illustrating an example hardware implementation for another apparatus (e.g., an electronic device) that can execute one or more of the methods for supporting communication in accordance with some aspects of the disclosure.

FIG. 11 illustrates a block diagram of an example hardware implementation of another apparatus 1100 configured to communicate according to one or more aspects of the disclosure. For example, the apparatus 1100 could embody or be implemented within a UE, a base station (e.g., an eNB), or some other type of device that supports wireless communication. In various implementations, the apparatus 1100 could embody or be implemented within an access terminal, an access point, or some other type of device. In various implementations, the apparatus 1100 could embody or be implemented within a mobile phone, a smart phone, a tablet, a portable computer, a server, a personal computer, a sensor, an entertainment device, a vehicular component, medical devices, or any other electronic device having circuitry.

The apparatus 1100 includes a communication interface (e.g., at least one transceiver) 1102, a storage medium 1104, a user interface 1106, a memory device 1108 (e.g., storing pilot-related information 1118), and a processing circuit (e.g., at least one processor) 1110. In various implementations, the user interface 1106 may include one or more of: a keypad, a display, a speaker, a microphone, a touchscreen display, of some other circuitry for receiving an input from or sending an output to a user. The communication interface 1102 may be coupled to one or more antennas 1112, and may include a transmitter 1114 and a receiver 1116. In general, the components of FIG. 11 may be similar to corresponding components of the apparatus 800 of FIG. 8.

According to one or more aspects of the disclosure, the processing circuit 1110 may be adapted to perform any or all of the features, processes, functions, operations and/or routines for any or all of the apparatuses described herein. For example, the processing circuit 1110 may be configured to perform any of the steps, functions, and/or processes described with respect to FIGS. 1-7 and 12. As used herein, the term "adapted" in relation to the processing circuit 1110 may refer to the processing circuit 1110 being one or more of configured, employed, implemented, and/or programmed to perform a particular process, function, operation and/or routine according to various features described herein.

The processing circuit 1110 may be a specialized processor, such as an application specific integrated circuit (ASIC) that serves as a means for (e.g., structure for) carrying out any one of the operations described in conjunction with FIGS. 1-7 and 12. The processing circuit 1110 serves as one example of a means for transmitting and/or a means for receiving. In some implementations, the processing circuit 1110 incorporates the functionality of the processing circuit 324 of FIG. 3.

According to at least one example of the apparatus 1100, the processing circuit 1110 may include one or more of a circuit/module for receiving 1120, a circuit/module for generating a channel estimate 1122, or a circuit/module for decoding 1124. In some implementations, the circuit/module for receiving 1120, the circuit/module for generating a channel estimate 1122, and the circuit/module for decoding 1124 correspond, at least in part, to the processing circuit 324 of FIG. 3.

The circuit/module for receiving 1120 may include circuitry and/or programming (e.g., code for receiving 1126 stored on the storage medium 1104) adapted to perform several functions relating to, for example, receiving information. In some implementations, the circuit/module for receiving 1120 is configured to receive an indication of a pilot structure. In some implementations, the circuit/module for receiving 1120 is configured to receive a pilot according to an indicated pilot structure. Initially, the circuit/module for receiving 1120 obtains information. For example, the circuit/module for receiving 1120 may obtain this information from a component of the apparatus (e.g., the receiver 1116, the memory device 1108, or some other component) or directly from a device (e.g., a base station, a user device, etc.) that transmitted the information. In some implementations, the circuit/module for receiving 1120 identifies a location in the memory device 1108 or some other component and invokes a read of that location to receive the information. In some implementations, the circuit/module for receiving 1120 processes (e.g., decodes) the received information. The circuit/module for receiving 1120 then outputs the received information (e.g., stores the information in the memory device 1108 or sends the information to another component of the apparatus 1100). In some implementations, the receiver 1116 includes the circuit/module for receiving 1120 and/or the code for receiving 1126.

The circuit/module for generating a channel estimate 1122 may include circuitry and/or programming (e.g., code for generating a channel estimate 1128 stored on the storage medium 1104) adapted to perform several functions relating to, for example, generating a channel estimate based on received information (e.g., a received pilot). Initially, the circuit/module for generating a channel estimate 1122 obtains the received information. For example, the circuit/module for generating a channel estimate 1122 may obtain this information from a component of the apparatus (e.g., the memory device 1108, the receiver 1116, the circuit/module for receiving 1120, or some other component) or directly from a device (e.g., a base station, a user device, etc.) that transmits this information. The circuit/module for generating a channel estimate 1122 then estimates the channel over which the information was received based on information known about the originally transmitted information as well as transmitter and receiver parameters. Finally, the circuit/module for generating a channel estimate 1122 outputs the channel estimate to a component of the apparatus 1100 (e.g., the memory device 1108, the circuit/module for decoding 1124, or some other component). In some implementations, the communication interface 1102 includes the circuit/module for generating a channel estimate 1122 and/or the code for generating a channel estimate 1128.

The circuit/module for decoding 1124 may include circuitry and/or programming (e.g., code for decoding 1130 stored on the storage medium 1104) adapted to decode data from a TTI prior to the end of the TTI. Initially, the circuit/module for decoding 1124 obtains received information. For example, the circuit/module for decoding 1124 may obtain this information from a component of the apparatus 1100 (e.g., the memory device 1108, the receiver 1116, the circuit/module for receiving 1120, or some other component) or directly from a device (e.g., a base station, a user device, etc.) that transmitted the information. In some implementations, the circuit/module for decoding 1124 identifies a memory location of a value in the memory device 1108 and invokes a read of that location. In any event, the circuit/module for decoding 1124 commences the processing of the information received for a given TTI prior to the end of the TTI. For example, the circuit/module for decoding 1124 may process a pilot that is received at or near a beginning or a middle section of the TTI without waiting for the entirety of the TTI to be received. The circuit/module for decoding 1124 then outputs the decoded information to a component of the apparatus 1100 (e.g., the memory device 1108 or some other component). In some implementations, the receiver 1116 includes the circuit/module for decoding 1124 and/or the code for decoding 1130.

As mentioned above, programming stored by the storage medium 1104, when executed by the processing circuit 1110, causes the processing circuit 1110 to perform one or more of the various functions and/or process operations described herein. For example, the programming, when executed by the processing circuit 1110, may cause the processing circuit 1110 to perform the various functions, steps, and/or processes described herein with respect to FIGS. 1-7 and 12 in various implementations. As shown in FIG. 11, the storage medium 1104 may include one or more of the code for receiving 1126, the code for generating a channel estimate 1128, or the code for decoding 1130.

Example Process

Figure 12:
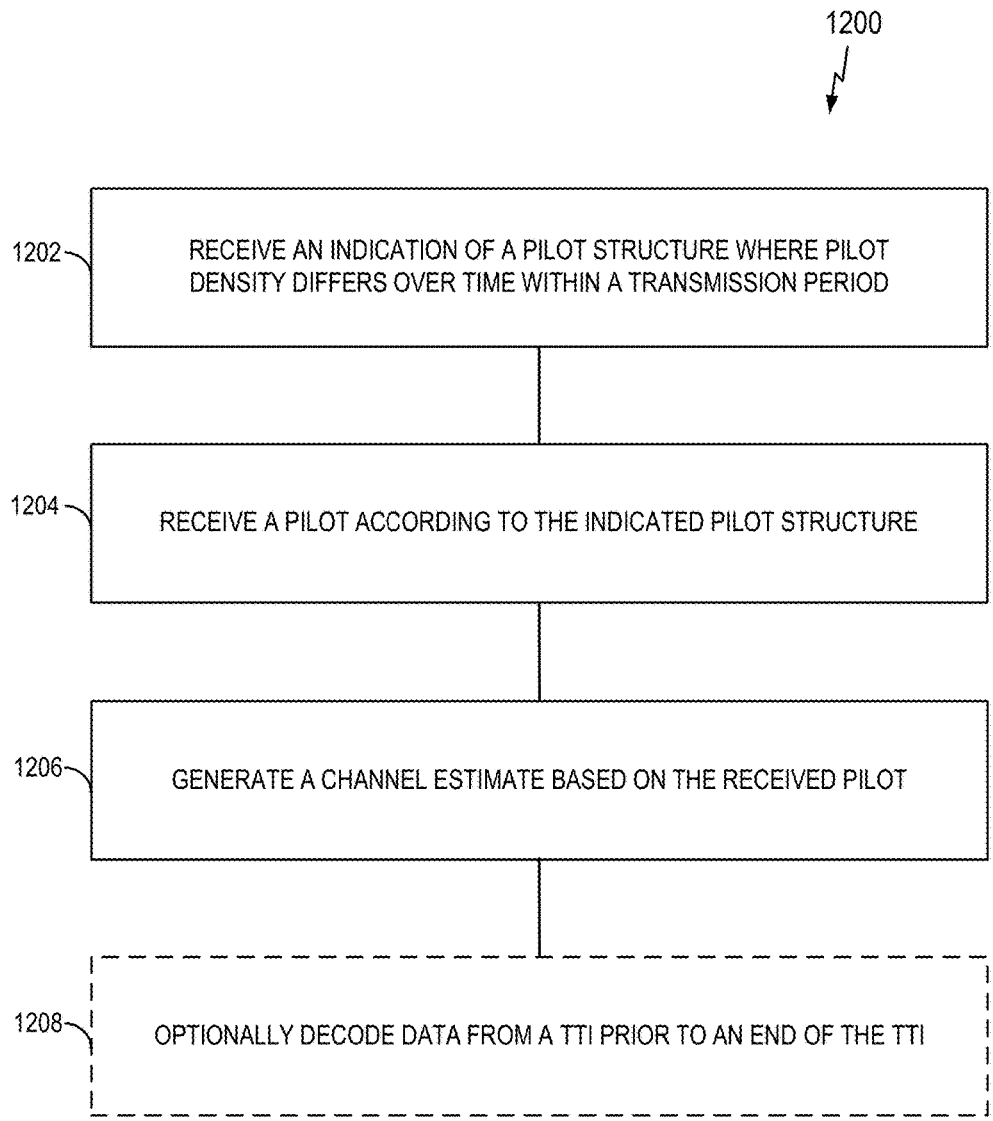
FIG. 12 is a flowchart illustrating an example of a process for communication in accordance with some aspects of the disclosure.

FIG. 12 illustrates a process 1200 for communication in accordance with some aspects of the disclosure. In some aspects, the process 1200 may be complementary to the process 900 of FIG. 9. The process 1200 may take place within a processing circuit (e.g., the processing circuit 1110 of FIG. 11), which may be located in a base station, an access terminal, or some other suitable apparatus. In some implementations, the process 1200 represents operations performed by the processing circuit 324 of FIG. 3. Of course, in various aspects within the scope of the disclosure, the process 1200 may be implemented by any suitable apparatus capable of supporting communication operations.

At block 1202, an apparatus (e.g., a UE) receives an indication of a pilot structure where pilot density differs over time within a transmission period. For example, a UE can receive an indication transmitted by an eNB (e.g., as discussed above in conjunction with block 904 of FIG. 9).

In some aspects, the pilot density relates to at least one of: time, frequency, or transmit power. In some aspects, the pilot density is higher at a beginning portion of the transmission period (e.g., the pilot density at a beginning of the transmission period is higher than the pilot density at a later portion of the transmission period).

In some implementations, the circuit/module for receiving 1120 of FIG. 11 performs the operations of block 1202. In some implementations, the code for receiving 1126 of FIG. 11 is executed to perform the operations of block 1202.

At block 1204, the apparatus receives a pilot according to the indicated pilot structure. For example, a UE can receive a pilot that was transmitted at a time and/or frequency specified by the indicated pilot structure. In some aspects, the pilot may be a demodulation reference signal (DMRS). In some aspects, pilots in the pilot structure are located at a beginning portion and/or a middle portion of a transmission time interval (TTI).

In some implementations, the circuit/module for receiving 1120 of FIG. 11 performs the operations of block 1204. In some implementations, the code for receiving 1126 of FIG. 11 is executed to perform the operations of block 1204.

At block 1206, the apparatus generates a channel estimate based on the received pilot. In some aspects, the apparatus generates the channel estimate based on a pilot received prior to an end of the TTI.

In some implementations, the circuit/module for generating a channel estimate 1122 of FIG. 11 performs the operations of block 1206. In some implementations, the code for generating a channel estimate 1128 of FIG. 11 is executed to perform the operations of block 1206.

At optional block 1208, the apparatus may decode data from the TTI prior to the end of the TTI. In some aspects, this decoding may be based on the channel estimate generated at block 1206.

In some implementations, the circuit/module for decoding 1124 of FIG. 11 performs the operations of block 1208. In some implementations, the code for decoding 1130 of FIG. 11 is executed to perform the operations of block 1208.

Example Apparatus

Figure 13:
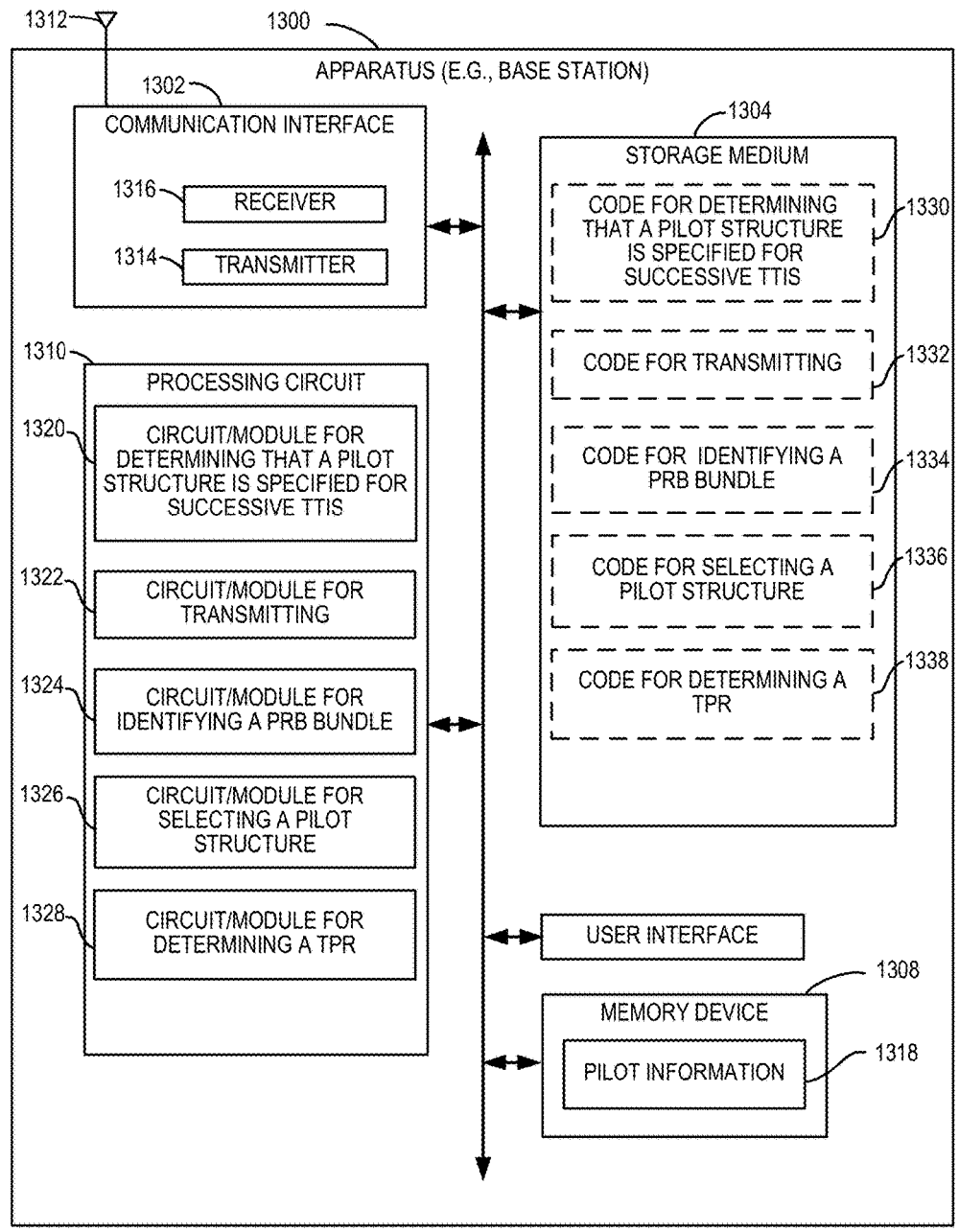
FIG. 13 is a block diagram illustrating an example hardware implementation for another apparatus (e.g., an electronic device) that can execute one or more of the methods for supporting communication in accordance with some aspects of the disclosure.

FIG. 13 illustrates a block diagram of an example hardware implementation of another apparatus 1300 configured to communicate according to one or more aspects of the disclosure. For example, the apparatus 1300 could embody or be implemented within a base station (e.g., an eNB), a UE, or some other type of device that supports wireless communication. In various implementations, the apparatus 1300 could embody or be implemented within an access terminal, an access point, or some other type of device. In various implementations, the apparatus 1300 could embody or be implemented within a mobile phone, a smart phone, a tablet, a portable computer, a server, a personal computer, a sensor, an entertainment device, a vehicular component, medical devices, or any other electronic device having circuitry.

The apparatus 1300 includes a communication interface (e.g., at least one transceiver) 1302, a storage medium 1304, a user interface 1306, a memory device 1308 (e.g., storing pilot-related information 1318), and a processing circuit (e.g., at least one processor) 1310. In various implementations, the user interface 1306 may include one or more of: a keypad, a display, a speaker, a microphone, a touchscreen display, of some other circuitry for receiving an input from or sending an output to a user. The communication interface 1302 may be coupled to one or more antennas 1312, and may include a transmitter 1314 and a receiver 1316. In general, the components of FIG. 13 may be similar to corresponding components of the apparatus 800 of FIG. 8.

According to one or more aspects of the disclosure, the processing circuit 1310 may be adapted to perform any or all of the features, processes, functions, operations and/or routines for any or all of the apparatuses described herein. For example, the processing circuit 1310 may be configured to perform any of the steps, functions, and/or processes described with respect to FIGS. 1-7 and 14-16. As used herein, the term "adapted" in relation to the processing circuit 1310 may refer to the processing circuit 1310 being one or more of configured, employed, implemented, and/or programmed to perform a particular process, function, operation and/or routine according to various features described herein.

The processing circuit 1310 may be a specialized processor, such as an application specific integrated circuit (ASIC) that serves as a means for (e.g., structure for) carrying out any one of the operations described in conjunction with FIGS. 1-7 and 14-16. The processing circuit 1310 serves as one example of a means for transmitting and/or a means for receiving. In various implementations, the processing circuit 1310 may incorporate the functionality of the processing circuit 522 of FIG. 5, the processing circuit 622 of FIG. 6, or the processing circuit 722 of FIG. 7.

According to at least one example of the apparatus 1300, the processing circuit 1310 may include one or more of a circuit/module for determining that a pilot structure is specified for successive TTIs 1320, a circuit/module for transmitting 1322, a circuit/module for identifying a PRB bundle 1324, a circuit/module for selecting a pilot structure 1326, or a circuit/module for determining a TPR 1328. In various implementations, the circuit/module for determining that a pilot structure is specified for successive TTIs 1320, the circuit/module for transmitting 1322, the circuit/module for identifying a PRB bundle 1324, the circuit/module for selecting a pilot structure 1326, and the circuit/module for determining a TPR 1328 may correspond, at least in part, to the processing circuit 522 of FIG. 5, the processing circuit 622 of FIG. 6, or the processing circuit 722 of FIG. 7.

The circuit/module for determining that a pilot structure is specified for successive TTIs 1320 may include circuitry and/or programming (e.g., code for determining that a pilot structure is specified for successive TTIs 1330 stored on the storage medium 1304) adapted to perform several functions relating to, for example, determining that a particular pilot structure is specified for successive transmission time intervals (TTIs). Initially, the circuit/module for determining that a pilot structure is specified for successive TTIs 1320 obtains information that indicates that successive TTIs are similar (e.g., from the memory device 1308, the communication interface 1302, or some other component of the apparatus 1300). For example, the information may indicate that the communication interface 1302 will be using the same beamforming configuration for successive TTIs. The circuit/module for determining that a pilot structure is specified for successive TTIs 1320 can determine, based on the information, whether the pilot structure of successive TTIs will be the same. The circuit/module for determining that a pilot structure is specified for successive TTIs 1320 can thus decide whether a receiving device can use a pilot from a prior TTI for channel estimation associated with a later TTI. In addition, the circuit/module for determining that a pilot structure is specified for successive TTIs 1320 outputs an indication of the determination (e.g., whether the same pilot structure is used for successive TTIs and/or whether a pilot from a prior TTI can be used for channel estimation) to a component of the apparatus 1300 (e.g., the memory device 1308, the transmitter 1314, the circuit/module for transmitting 1322, or some other component).

The circuit/module for transmitting 1322 may include circuitry and/or programming (e.g., code for transmitting 1332 stored on the storage medium 1304) adapted to perform several functions relating to, for example, transmitting an indication or other information. In some implementations, the circuit/module for transmitting 1322 is configured to transmit an indication that a pilot from a prior TTI can be used for channel estimation. In some implementations, the circuit/module for transmitting 1322 is configured to transmit an indication of a selected pilot structure. In some implementations, the circuit/module for transmitting 1322 is configured to transmit an indication of a traffic-to-pilot ratio. Initially, the circuit/module for transmitting 1322 obtains data to be transmitted. For example, the circuit/module for transmitting 1322 may obtain this data from a component of the apparatus (e.g., the memory device 1308, the circuit/module for determining that a pilot structure is specified for successive TTIs 1320, the circuit/module for selecting a pilot structure 1326, the circuit/module for determining a TPR 1328, or some other component). In some implementations, the circuit/module for transmitting 1322 processes (e.g., encodes) the data to be transmitted. The circuit/module for transmitting 1322 then causes the data to be transmitted. For example, the circuit/module for transmitting 1322 can pass the data to the transmitter 1314 for subsequent radio frequency (RF) transmission. In some implementations, the transmitter 1314 includes the circuit/module for transmitting 1322 and/or the code for transmitting 1332.

The circuit/module for identifying a PRB bundle 1324 may include circuitry and/or programming (e.g., code for identifying a PRB bundle 1334 stored on the storage medium 1304) adapted to perform several functions relating to, for example, identifying a physical resource block (PRB) bundle that includes at least one PRB. Initially, the circuit/module for identifying a PRB bundle 1324 obtains information regarding resource requirements for future communications (e.g., based on information stored in the memory device 1308, received from the communication interface 1302, or some other component). The circuit/module for identifying a PRB bundle 1324 then selects a PRB bundle (e.g., a wideband bundle) to be used for this communication based on the PRB Bundling operations discussed above. The circuit/module for identifying a PRB bundle 1324 then sends an indication of the identified PRB bundle to a component of the apparatus 1300 (e.g., the memory device 1308, the circuit/module for selecting a pilot structure 1326, or some other component).

The circuit/module for selecting a pilot structure 1326 may include circuitry and/or programming (e.g., code for selecting a pilot structure 1336 stored on the storage medium 1304) adapted to perform several functions relating to, for example, selecting a pilot structure based on an identified PRB bundle. Initially, the circuit/module for selecting a pilot structure 1326 obtains information regarding a PRB bundle to be used for future communications (e.g., from the memory device 1308, the circuit/module for identifying a PRB bundle 1324, or some other component). The circuit/module for selecting a pilot structure 1326 then selects a pilot structure to be used for this communication that accommodates the PRB bundle. For example, the circuit/module for selecting a pilot structure 1326 may specify a pilot structure with pilots uniformly spread across a PRB bundle for wideband communication. The circuit/module for selecting a pilot structure 1326 then outputs an indication of the selected pilot structure to a component of the apparatus 1300 (e.g., the memory device 1308, the transmitter 1314, the circuit/module for transmitting 1322, or some other component).

The circuit/module for determining a TPR 1328 may include circuitry and/or programming (e.g., a module for determining a TPR 1338 stored on the storage medium 1304) adapted to perform several functions relating to, for example, determining a traffic-to-pilot ratio (TPR) for demodulation reference signals (DMRSs). Initially, the circuit/module for determining a TPR 1328 obtains information regarding channel conditions (e.g., from the memory device 1308, the communication interface 1302, or some other component). The circuit/module for determining a TPR 1328 then selects a TPR based on these channel conditions. For example, the circuit/module for determining a TPR 1328 may select a TPR to meet a particular SNR target, error rate target, or some other communication factor. In particular, the circuit/module for determining a TPR 1328 can optimize DMRS power for different MCSs, ranks, rates, and so on. The circuit/module for determining a TPR 1328 then outputs an indication of the determined TPR to a component of the apparatus 1300 (e.g., the memory device 1308, the transmitter 1314, the circuit/module for transmitting 1322, or some other component).

As mentioned above, programming stored by the storage medium 1304, when executed by the processing circuit 1310, causes the processing circuit 1310 to perform one or more of the various functions and/or process operations described herein. For example, the programming, when executed by the processing circuit 1310, may cause the processing circuit 1310 to perform the various functions, steps, and/or processes described herein with respect to FIGS. 1-7 and 14-16 in various implementations. As shown in FIG. 13, the storage medium 1304 may include one or more of the code for determining that a pilot structure is specified for successive TTIs 1330, the code for transmitting 1332, the code for identifying a PRB bundle 1334, the code for selecting a pilot structure 1336, or the code for determining a TPR 1338.

Example Processes

Figure 14:
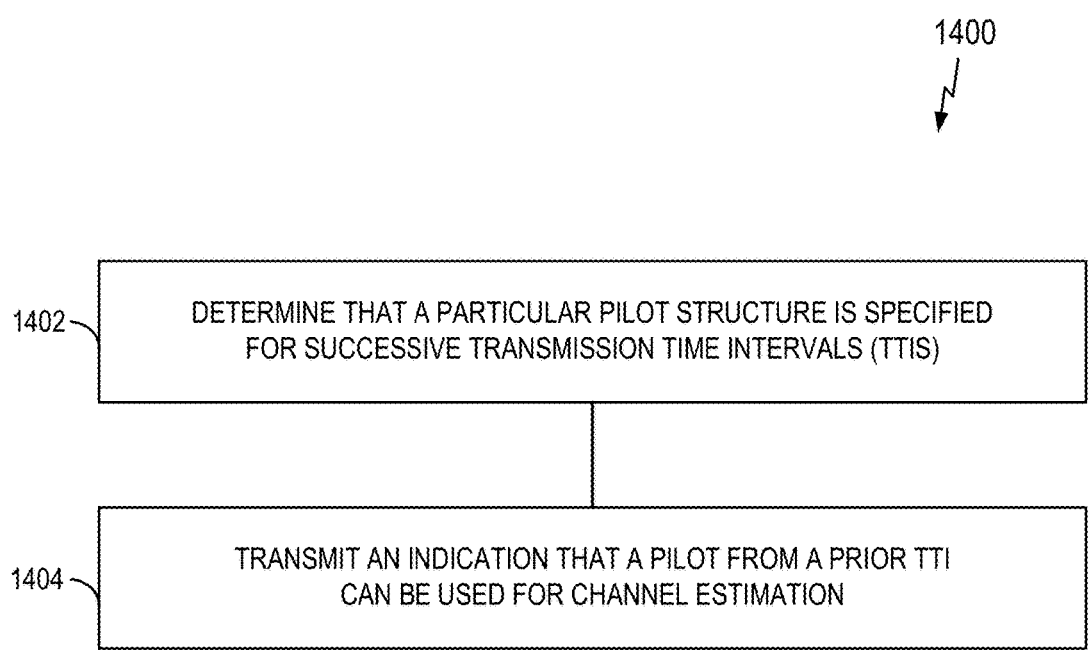
FIG. 14 is a flowchart illustrating an example of a process involving transmission of a pilot indication in accordance with some aspects of the disclosure.

FIG. 14 illustrates a process 1400 for communication in accordance with some aspects of the disclosure. In some implementations, the process 1400 may be performed in addition to (e.g., in conjunction with) the process 900 of FIG. 9. The process 1400 may take place within a processing circuit (e.g., the processing circuit 1310 of FIG. 13), which may be located in a base station, an access terminal, or some other suitable apparatus. In some implementations, the process 1400 represents operations performed by the processing circuit 522 of FIG. 5. Of course, in various aspects within the scope of the disclosure, the process 1400 may be implemented by any suitable apparatus capable of supporting communication operations.

At block 1402, an apparatus (e.g., a base station) determines that a particular pilot structure is specified for successive transmission time intervals (TTIs). That is, the apparatus determines that the pilot structures for successive TTIs are the same. For example, an eNB may determine that the beamforming will (or has) not changed from one TTI to the next and, consequently, the pilot structure will (or has) not changed.

In some implementations, the circuit/module for determining that a pilot structure is specified for successive TTIs 1320 of FIG. 13 performs the operations of block 1402. In some implementations, the code for determining that a pilot structure is specified for successive TTIs 1330 of FIG. 13 is executed to perform the operations of block 1402.

At block 1404, the apparatus transmits an indication that a pilot from a prior TTI can be used for channel estimation. In some aspects, the apparatus transmits this indication as a result of the determination of block 1402. In an example implementation, an eNB may transmit this indication (e.g., by broadcasting the indication or by unicasting the indication to a UE). In some aspects, the pilot may be a demodulation reference signal (DMRS).

In some implementations, the circuit/module for transmitting 1322 of FIG. 13 performs the operations of block 1404. In some implementations, the code for transmitting 1332 of FIG. 13 is executed to perform the operations of block 1404.

Figure 15:
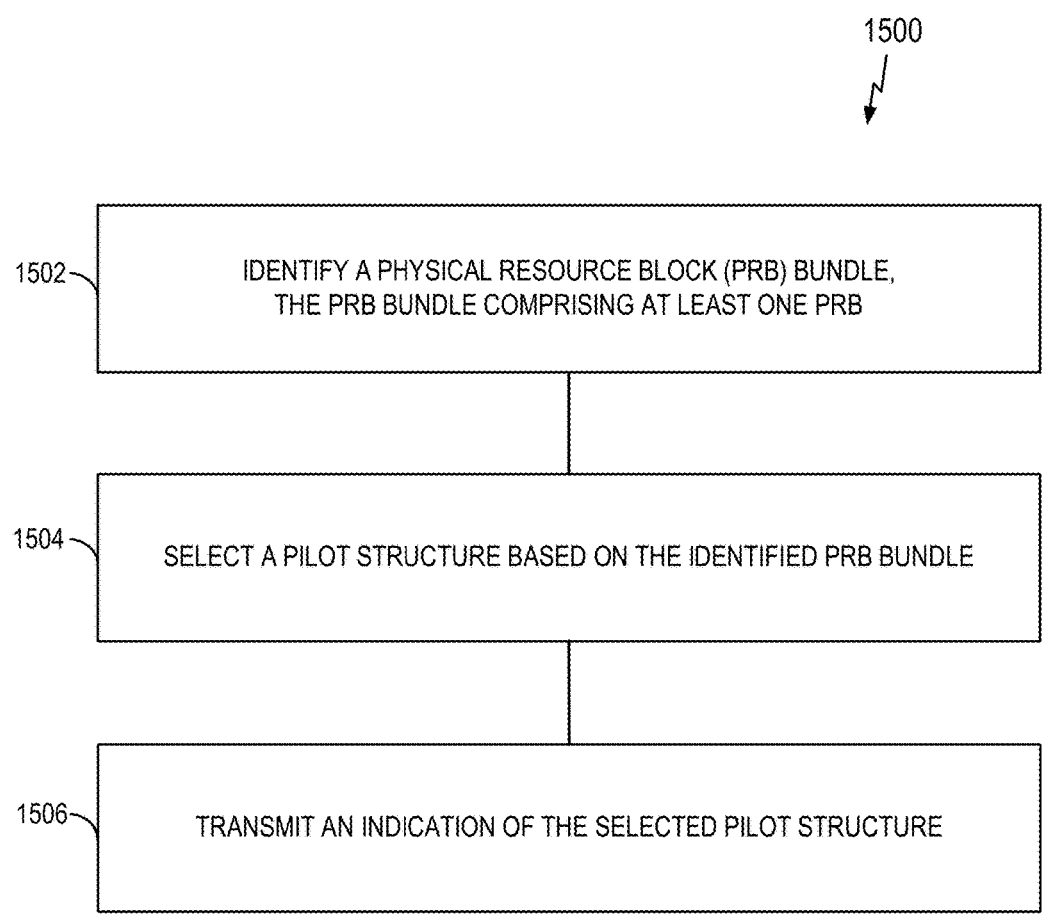
FIG. 15 is a flowchart illustrating an example of a process involving transmission of an indication of a pilot structure in accordance with some aspects of the disclosure.

FIG. 15 illustrates a process 1500 for communication in accordance with some aspects of the disclosure. In some implementations, the process 1500 may be performed in addition to (e.g., in conjunction with) the process 900 of FIG. 9. The process 1500 may take place within a processing circuit (e.g., the processing circuit 1310 of FIG. 13), which may be located in a base station, an access terminal, or some other suitable apparatus. In some implementations, the process 1500 represents operations performed by the processing circuit 622 of FIG. 6. Of course, in various aspects within the scope of the disclosure, the process 1500 may be implemented by any suitable apparatus capable of supporting communication operations.

At block 1502, an apparatus (e.g., a base station) identifies a physical resource block (PRB) bundle. The PRB bundle includes at least one PRB.

In some implementations, the circuit/module for identifying a PRB bundle 1324 of FIG. 13 performs the operations of block 1502. In some implementations, the code for identifying a PRB bundle 1334 of FIG. 13 is executed to perform the operations of block 1502.

At block 1504, the apparatus selects a pilot structure based on the identified PRB bundle. In some aspects, the selection of the pilot structure includes selecting spacing for pilots based on a bandwidth of the PRB bundle. In some aspects, the pilot structure is for demodulation reference signals (DMRSs). In various scenarios, the selected pilot structure may be the same as or different from the pilot structure determined at block 902 of FIG. 9 (e.g., the selected pilot structure may be another pilot structure).

In some implementations, the circuit/module for selecting a pilot structure 1326 of FIG. 13 performs the operations of block 1504. In some implementations, the code for selecting a pilot structure 1336 of FIG. 13 is executed to perform the operations of block 1504.

At block 1506, the apparatus transmits an indication of the selected pilot structure (e.g., the selected other pilot structure). For example, the apparatus may broadcast the indication or unicast the indication to a UE. In some aspects, the indication may be a precoding matrix indicator (PMI). In some aspects, the indication indicates a difference between neighbor resource block (RB) PMIs.

In some implementations, the circuit/module for transmitting 1322 of FIG. 13 performs the operations of block 1506. In some implementations, the code for transmitting 1332 of FIG. 13 is executed to perform the operations of block 1506.

Figure 16:
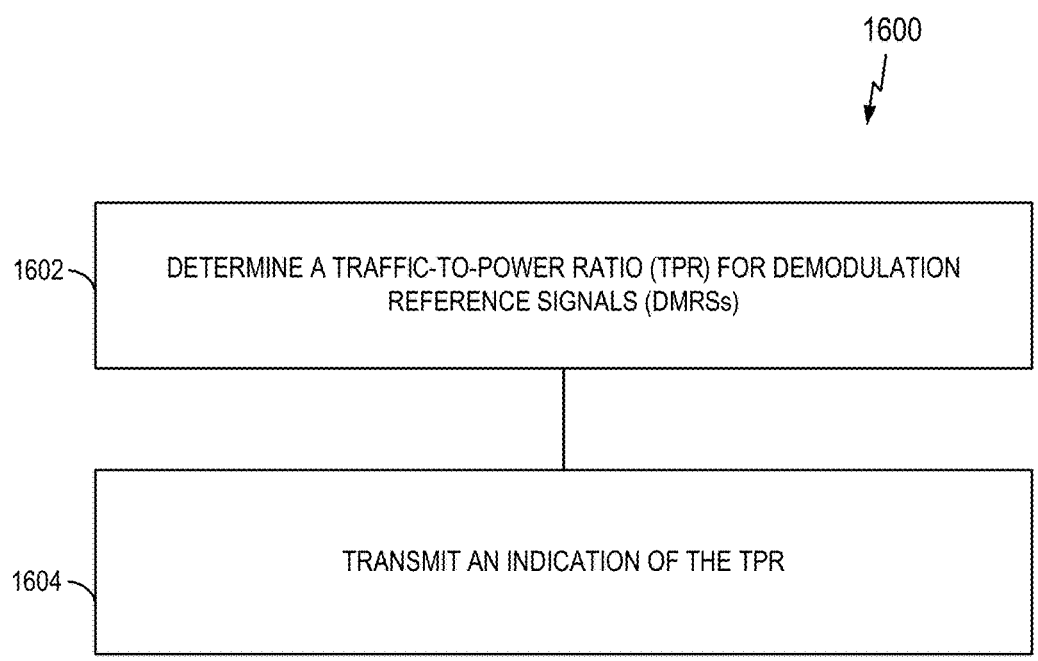
FIG. 16 is a flowchart illustrating an example of a process involving transmission of an indication of a traffic-to-pilot ratio (TPR) in accordance with some aspects of the disclosure.

FIG. 16 illustrates a process 1600 for communication in accordance with some aspects of the disclosure. In some implementations, the process 1600 may be performed in addition to (e.g., in conjunction with) the process 900 of FIG. 9. The process 1600 may take place within a processing circuit (e.g., the processing circuit 1310 of FIG. 13), which may be located in a base station, an access terminal, or some other suitable apparatus. In some implementations, the process 1600 represents operations performed by the processing circuit 722 of FIG. 7. Of course, in various aspects within the scope of the disclosure, the process 1600 may be implemented by any suitable apparatus capable of supporting communication operations.

At block 1602, an apparatus (e.g., a base station) determines a traffic-to-pilot ratio (TPR) for demodulation reference signals (DMRSs). In some aspects, the TPR is determined based on at least one of: a modulation and coding scheme (MCS), a rank, or a rate.

In some implementations, the circuit/module for determining a TPR 1328 of FIG. 13 performs the operations of block 1602. In some implementations, the code for determining a TPR 1338 of FIG. 13 is executed to perform the operations of block 1602.

At block 1604, the apparatus transmits an indication of the TPR. For example, the apparatus may broadcast the indication or unicast the indication to a UE.

In some implementations, the circuit/module for transmitting 1322 of FIG. 13 performs the operations of block 1604. In some implementations, the code for transmitting 1332 of FIG. 13 is executed to perform the operations of block 1604.

Example Apparatus

Figure 17:
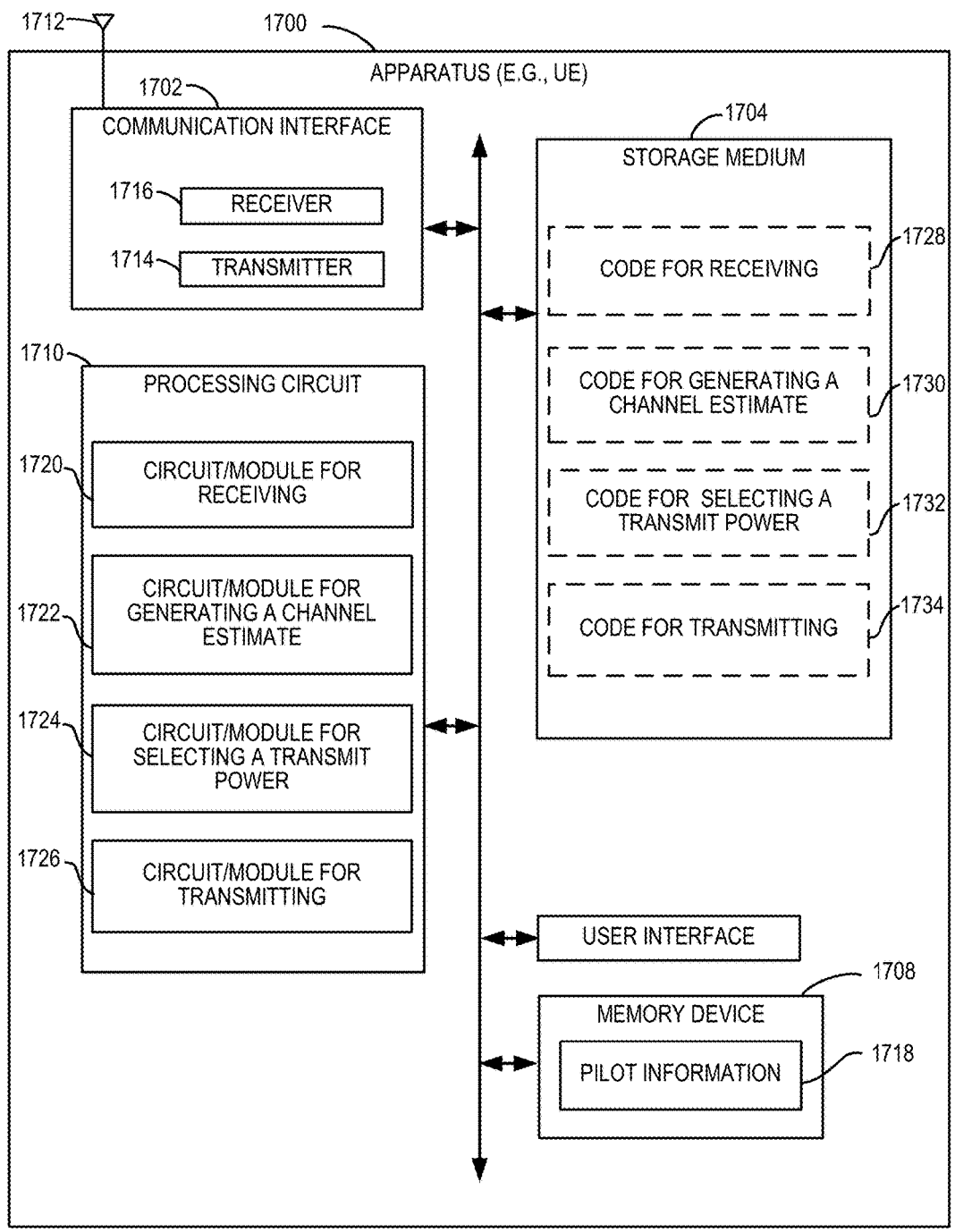
FIG. 17 is a block diagram illustrating an example hardware implementation for another apparatus (e.g., an electronic device) that can execute one or more of the methods for supporting communication in accordance with some aspects of the disclosure.

FIG. 17 illustrates a block diagram of an example hardware implementation of another apparatus 1700 configured to communicate according to one or more aspects of the disclosure. For example, the apparatus 1700 could embody or be implemented within a UE, a base station (e.g., an eNB), or some other type of device that supports wireless communication. In various implementations, the apparatus 1700 could embody or be implemented within an access terminal, an access point, or some other type of device. In various implementations, the apparatus 1700 could embody or be implemented within a mobile phone, a smart phone, a tablet, a portable computer, a server, a personal computer, a sensor, an entertainment device, a vehicular component, medical devices, or any other electronic device having circuitry.

The apparatus 1700 includes a communication interface (e.g., at least one transceiver) 1702, a storage medium 1704, a user interface 1706, a memory device 1708 (e.g., storing pilot-related information 1718), and a processing circuit (e.g., at least one processor) 1710. In various implementations, the user interface 1706 may include one or more of: a keypad, a display, a speaker, a microphone, a touchscreen display, of some other circuitry for receiving an input from or sending an output to a user. The communication interface 1702 may be coupled to one or more antennas 1712, and may include a transmitter 1714 and a receiver 1716. In general, the components of FIG. 17 may be similar to corresponding components of the apparatus 800 of FIG. 8.

According to one or more aspects of the disclosure, the processing circuit 1710 may be adapted to perform any or all of the features, processes, functions, operations and/or routines for any or all of the apparatuses described herein. For example, the processing circuit 1710 may be configured to perform any of the steps, functions, and/or processes described with respect to FIGS. 1-7 and 18-20. As used herein, the term "adapted" in relation to the processing circuit 1710 may refer to the processing circuit 1710 being one or more of configured, employed, implemented, and/or programmed to perform a particular process, function, operation and/or routine according to various features described herein.

The processing circuit 1710 may be a specialized processor, such as an application specific integrated circuit (ASIC) that serves as a means for (e.g., structure for) carrying out any one of the operations described in conjunction with FIGS. 1-7 and 18-20. The processing circuit 1710 serves as one example of a means for transmitting and/or a means for receiving. In various implementations, the processing circuit 1710 may incorporate the functionality of the processing circuit 524 of FIG. 5, the processing circuit 624 of FIG. 6, or the processing circuit 724 of FIG. 7.

According to at least one example of the apparatus 1700, the processing circuit 1710 may include one or more of a circuit/module for receiving 1720, a circuit/module for generating a channel estimate 1722, a circuit/module for selecting a transmit power 1724, or a circuit/module for transmitting 1726. In various implementations, the circuit/module for receiving 1720, the circuit/module for generating a channel estimate 1722, the circuit/module for selecting a transmit power 1724, or the circuit/module for transmitting 1726 may correspond, at least in part, to the processing circuit 524 of FIG. 5, the processing circuit 624 of FIG. 6, or the processing circuit 724 of FIG. 7.

The circuit/module for receiving 1720 may include circuitry and/or programming (e.g., code for receiving 1728 stored on the storage medium 1704) adapted to perform several functions relating to, for example, receiving information. In some implementations, the circuit/module for receiving 1720 is configured to receive an indication that a pilot from a prior TTI can be used for channel estimation. In some implementations, the circuit/module for receiving 1720 is configured to receive TTIs. In some implementations, the circuit/module for receiving 1720 is configured to receive an indication of a pilot structure selected based on a PRB bundle. In some implementations, the circuit/module for receiving 1720 is configured to receive a pilot according to a received indication of a pilot structure. In some implementations, the circuit/module for receiving 1720 is configured to receive an indication of a TPR for DMRSs. Initially, the circuit/module for receiving 1720 obtains information. For example, the circuit/module for receiving 1720 may obtain this information from a component of the apparatus (e.g., the memory device 1708, the receiver 1716, or some other component) or directly from a device (e.g., a base station, a user device, etc.) that transmitted the information. In some implementations, the circuit/module for receiving 1720 identifies a location in the memory device 1708 or some other component and invokes a read of that location to receive the information. In some implementations, the circuit/module for receiving 1720 processes (e.g., decodes) the received information. The circuit/module for receiving 1720 then outputs the received information to a component of the apparatus 1700 (e.g., the memory device 1708, the circuit/module for generating a channel estimate 1722, the circuit/module for selecting a transmit power 1724, or some other component). In some implementations, the receiver 1716 includes the circuit/module for receiving 1720 and/or the code for receiving 1728.

The circuit/module for generating a channel estimate 1722 may include circuitry and/or programming (e.g., code for generating a channel estimate 1730 stored on the storage medium 1704) adapted to perform several functions relating to, for example, generating a channel estimate based on received information. In some implementations, the circuit/module for generating a channel estimate 1722 is configured to generate a channel estimate for decoding data from a second TTI based, at least in part, on a pilot from a first TTI. In some implementations, the circuit/module for generating a channel estimate 1722 is configured to generate a channel estimate based on a received pilot. Initially, the circuit/module for generating a channel estimate 1722 obtains the received information (e.g., pilot information). For example, the circuit/module for generating a channel estimate 1722 may obtain this information from a component of the apparatus (e.g., the memory device 1708, the receiver 1716, the circuit/module for receiving 1720, or some other component) or directly from a device (e.g., a base station, a user device, etc.) that transmits this information. The circuit/ module for generating a channel estimate 1722 then estimates the channel over which the information was received based on information known about the originally transmitted information as well as transmitter and receiver parameters. Finally, the circuit/module for generating a channel estimate 1722 outputs the channel estimate (e.g., stores channel estimate information in the memory device 1708 or sends the information to another component of the apparatus 1700). In some implementations, the communication interface 1702 includes the circuit/module for generating a channel estimate 1722 and/or the code for generating a channel estimate 1730.

The circuit/module for selecting a transmit power 1724 may include circuitry and/or programming (e.g., code for selecting a transmit power 1732 stored on the storage medium 1704) adapted to perform several functions relating to, for example, selecting a transmit power based on a traffic-to-pilot ratio (TPR) for demodulation reference signals (DMRSs). Initially, the circuit/module for selecting a transmit power 1724 obtains a TPR indication (e.g., from the memory device 1708, the receiver 1716, the circuit/module for receiving 1720, or some other component). The circuit/module for selecting a transmit power 1724 then selects a transmit power based on the TPR and other power-related information (e.g., pilot power). Finally, the circuit/module for selecting a transmit power 1724 outputs an indication of the selected transmit power to a component of the apparatus 1700 (e.g., the memory device 1708, the transmitter 1714, the circuit/module for transmitting 1726, or some other component).

The circuit/module for transmitting 1726 may include circuitry and/or programming (e.g., code for transmitting 1734 stored on the storage medium 1704) adapted to perform several functions relating to, for example, transmitting signals according to a selected transmit power. Initially, the circuit/module for transmitting 1726 obtains data to be transmitted and an indication of a selected transmit power. For example, the circuit/module for transmitting 1726 may obtain this data and indication from a component of the apparatus (e.g., the memory device 1708, the circuit/module for selecting a transmit power 1732, or some other component). In some implementations, the circuit/module for transmitting 1726 processes (e.g., encodes) the data to be transmitted. The circuit/module for transmitting 1726 then causes the data to be transmitted at the indicated transmit power. For example, the circuit/module for transmitting 1726 can pass the data and indication of transmit power to the transmitter 1714 for subsequent radio frequency (RF) transmission. In some implementations, the transmitter 1714 includes the circuit/module for transmitting 1726 and/or the code for transmitting 1734.

As mentioned above, programming stored by the storage medium 1704, when executed by the processing circuit 1710, causes the processing circuit 1710 to perform one or more of the various functions and/or process operations described herein. For example, the programming, when executed by the processing circuit 1710, may cause the processing circuit 1710 to perform the various functions, steps, and/or processes described herein with respect to FIGS. 1-7 and 18-20 in various implementations. As shown in FIG. 17, the storage medium 1704 may include one or more of the code for receiving 1728, the code for generating a channel estimate 1730, the code for selecting a transmit power 1732, or the code for transmitting 1734.

Example Processes

Figure 18:
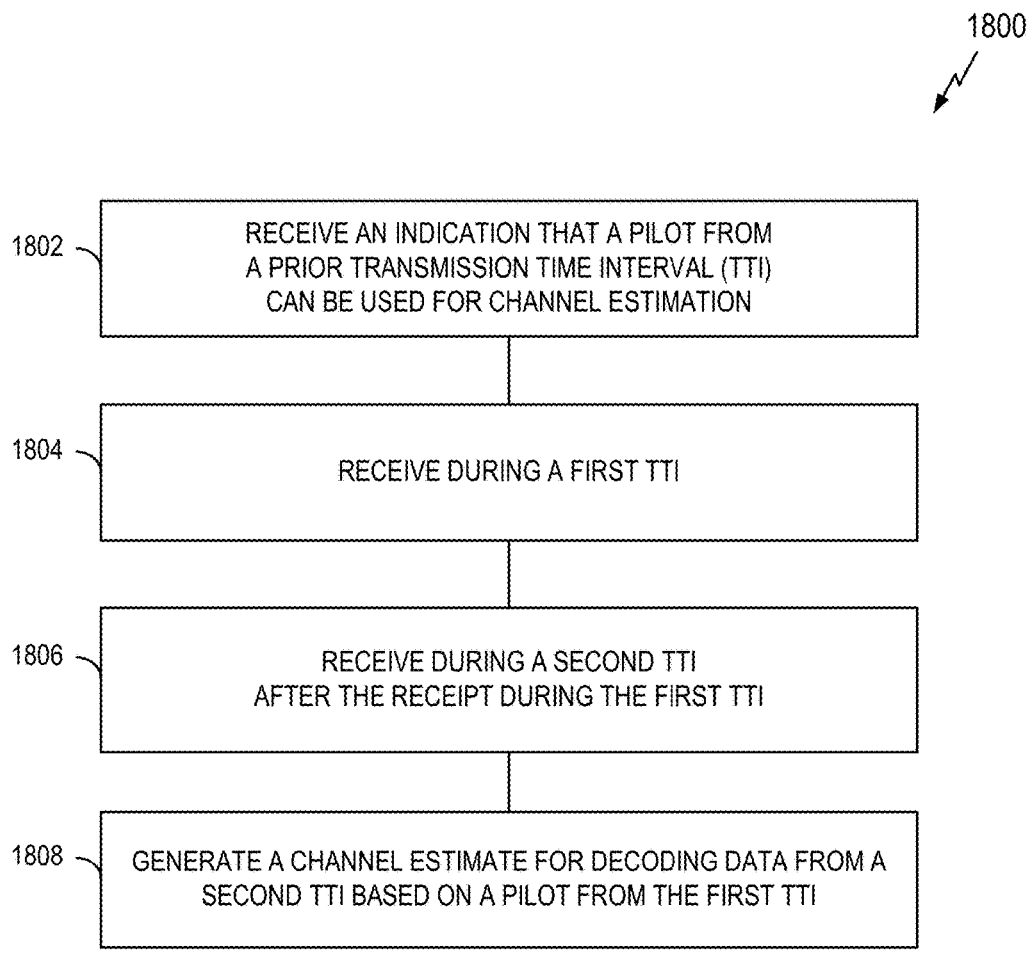
FIG. 18 is a flowchart illustrating an example of a process involving generation of a channel estimate in accordance with some aspects of the disclosure.

FIG. 18 illustrates a process 1800 for communication in accordance with some aspects of the disclosure. In some implementations, the process 1800 may be performed in addition to (e.g., in conjunction with) the process 1200 of FIG. 12. The process 1800 may take place within a processing circuit (e.g., the processing circuit 1710 of FIG. 17), which may be located in an access terminal, a base station, or some other suitable apparatus. In some implementations, the process 1800 represents operations performed by the processing circuit 524 of FIG. 5. Of course, in various aspects within the scope of the disclosure, the process 1800 may be implemented by any suitable apparatus capable of supporting communication operations.

At block 1802, an apparatus (e.g., a UE) receives an indication that a pilot from a prior transmission time interval (TTI) can be used for channel estimation. For example, a UE can receive an indication transmitted by an eNB (e.g., as discussed above in conjunction with block 1404 of FIG. 14).

In some implementations, the circuit/module for receiving 1720 of FIG. 17 performs the operations of block 1802. In some implementations, the code for receiving 1728 of FIG. 17 is executed to perform the operations of block 1802.

At block 1804, the apparatus receives during a first TTI. For example, the apparatus could receive a first TTI of a frame.

In some implementations, the circuit/module for receiving 1720 of FIG. 17 performs the operations of block 1804. In some implementations, the code for receiving 1728 of FIG. 17 is executed to perform the operations of block 1804.

At block 1806, the apparatus receives during a second TTI after the receipt during the first TTI. For example, the apparatus could receive a second TTI of a frame.

In some implementations, the circuit/module for receiving 1720 of FIG. 17 performs the operations of block 1806. In some implementations, the code for receiving 1728 of FIG. 17 is executed to perform the operations of block 1806.

At block 1808, the apparatus generates a channel estimate for decoding data from a second TTI based on a pilot from the first TTI. In some aspects, the pilot may be a demodulation reference signal (DMRS).

In some implementations, the circuit/module for generating a channel estimate 1722 of FIG. 17 performs the operations of block 1808. In some implementations, the code for generating a channel estimate 1730 of FIG. 17 is executed to perform the operations of block 1808.

Figure 19:
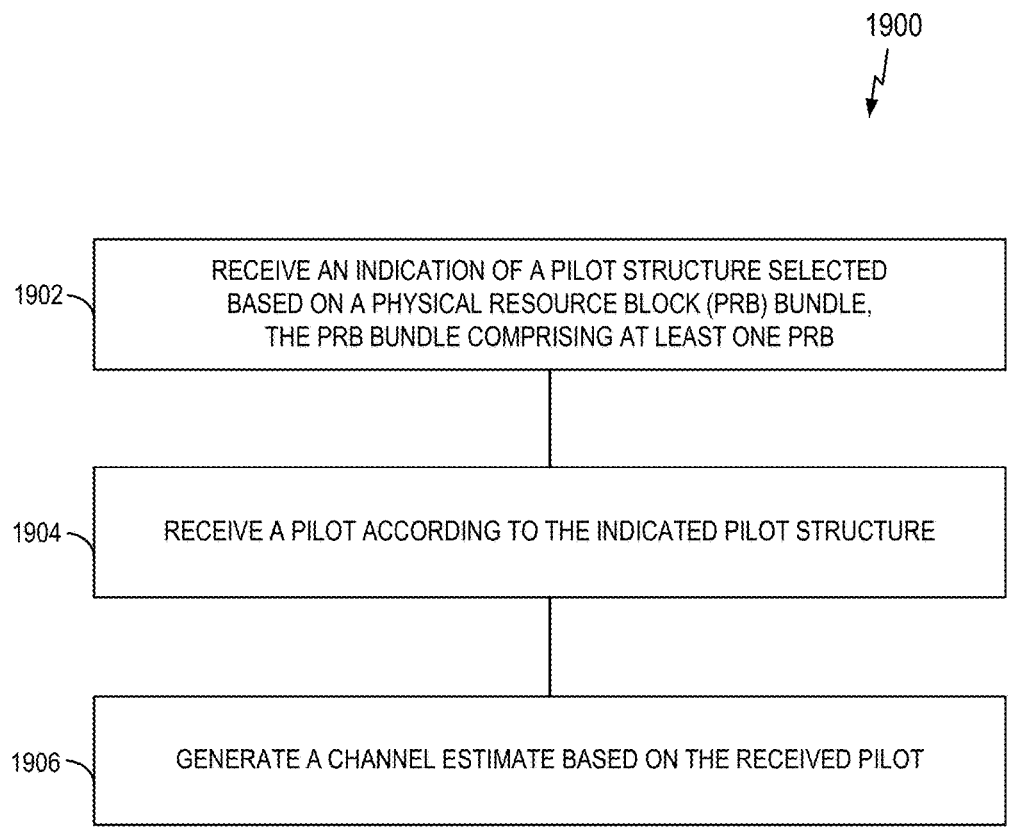
FIG. 19 is a flowchart illustrating another example of a process involving generation of a channel estimate in accordance with some aspects of the disclosure.

FIG. 19 illustrates a process 1900 for communication in accordance with some aspects of the disclosure. In some implementations, the process 1900 may be performed in addition to (e.g., in conjunction with) the process 1200 of FIG. 12. The process 1900 may take place within a processing circuit (e.g., the processing circuit 1710 of FIG. 17), which may be located in an access terminal, a base station, or some other suitable apparatus. In some implementations, the process 1900 represents operations performed by the processing circuit 624 of FIG. 6. Of course, in various aspects within the scope of the disclosure, the process 1900 may be implemented by any suitable apparatus capable of supporting communication operations.

At block 1902, an apparatus (e.g., a UE) receives an indication. For example, a UE can receive an indication transmitted by an eNB (e.g., as discussed above in conjunction with block 1506 of FIG. 15). The indication is of a pilot structure selected based on a physical resource block (PRB) bundle, the PRB bundle including at least one PRB. In some aspects, spacing for pilots defined by the pilot structure is based on a bandwidth of the PRB bundle. In some aspects, the indication may be a precoding matrix indicator (PMI). In some aspects, the indication indicates a difference between neighbor resource block (RB) PMIs.

In some implementations, the circuit/module for receiving 1720 of FIG. 17 performs the operations of block 1902. In some implementations, the code for receiving 1728 of FIG. 17 is executed to perform the operations of block 1902.

At block 1904, the apparatus receives a pilot according to the indicated pilot structure (e.g., from an eNB). In some aspects, the pilot may be a demodulation reference signal (DMRS).

In some implementations, the circuit/module for receiving 1720 of FIG. 17 performs the operations of block 1904. In some implementations, the code for receiving 1728 of FIG. 17 is executed to perform the operations of block 1904.

At block 1906, the apparatus generates a channel estimate. As discussed herein, this operation may be based on the received pilot.

In some implementations, the circuit/module for generating a channel estimate 1722 of FIG. 17 performs the operations of block 1906. In some implementations, the code for generating a channel estimate 1730 of FIG. 17 is executed to perform the operations of block 1906.

Figure 20:
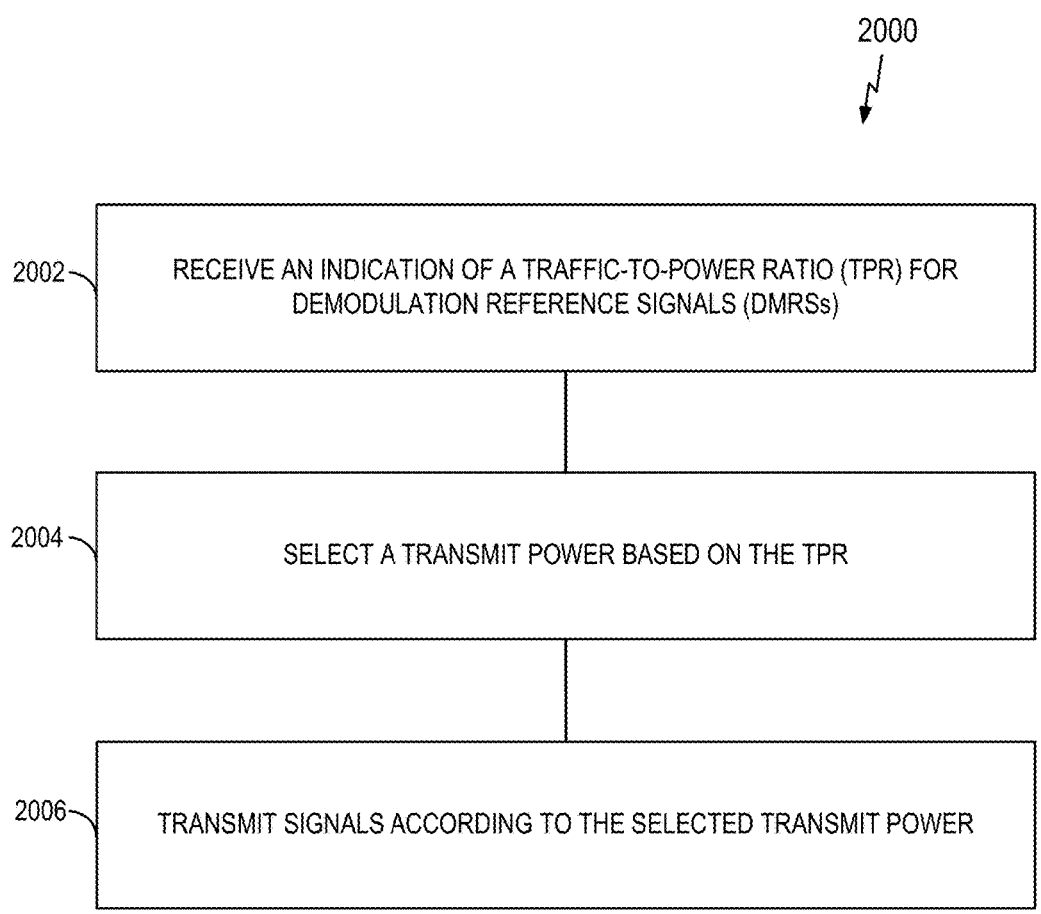
FIG. 20 is a flowchart illustrating an example of a process involving selection of a transmit power in accordance with some aspects of the disclosure.

FIG. 20 illustrates a process 2000 for communication in accordance with some aspects of the disclosure. In some implementations, the process 2000 may be performed in addition to (e.g., in conjunction with) the process 1200 of FIG. 12. The process 2000 may take place within a processing circuit (e.g., the processing circuit 1710 of FIG. 17), which may be located in an access terminal, a base station, or some other suitable apparatus. In some implementations, the process 2000 represents operations performed by the processing circuit 724 of FIG. 7. Of course, in various aspects within the scope of the disclosure, the process 2000 may be implemented by any suitable apparatus capable of supporting communication operations.

At block 2002, an apparatus (e.g., a UE) receives an indication of a traffic-to-pilot ratio (TPR) for demodulation reference signals (DMRSs). For example, a UE can receive an indication transmitted by an eNB (e.g., as discussed above in conjunction with block 1604 of FIG. 16). In some aspects, the TPR is determined based on at least one of: a modulation and coding scheme (MCS), a rank, or a rate.

In some implementations, the circuit/module for receiving 1720 of FIG. 17 performs the operations of block 2002. In some implementations, the code for receiving 1728 of FIG. 17 is executed to perform the operations of block 2002.

At block 2004, the apparatus selects a transmit power. As discussed herein, this selection is based on the TPR obtained at block 2002.

In some implementations, the circuit/module for selecting a transmit power 1724 of FIG. 17 performs the operations of block 2004. In some implementations, the code for selecting a transmit power 1732 of FIG. 17 is executed to perform the operations of block 2004.

At block 2006, the apparatus transmits signals according to the selected transmit power. For example, the apparatus may transmit traffic at a transmit power level selected at block 2004.

In some implementations, the circuit/module for transmitting 1726 of FIG. 17 performs the operations of block 2006. In some implementations, the code for transmitting 1734 of FIG. 17 is executed to perform the operations of block 2006.

Figure 21:
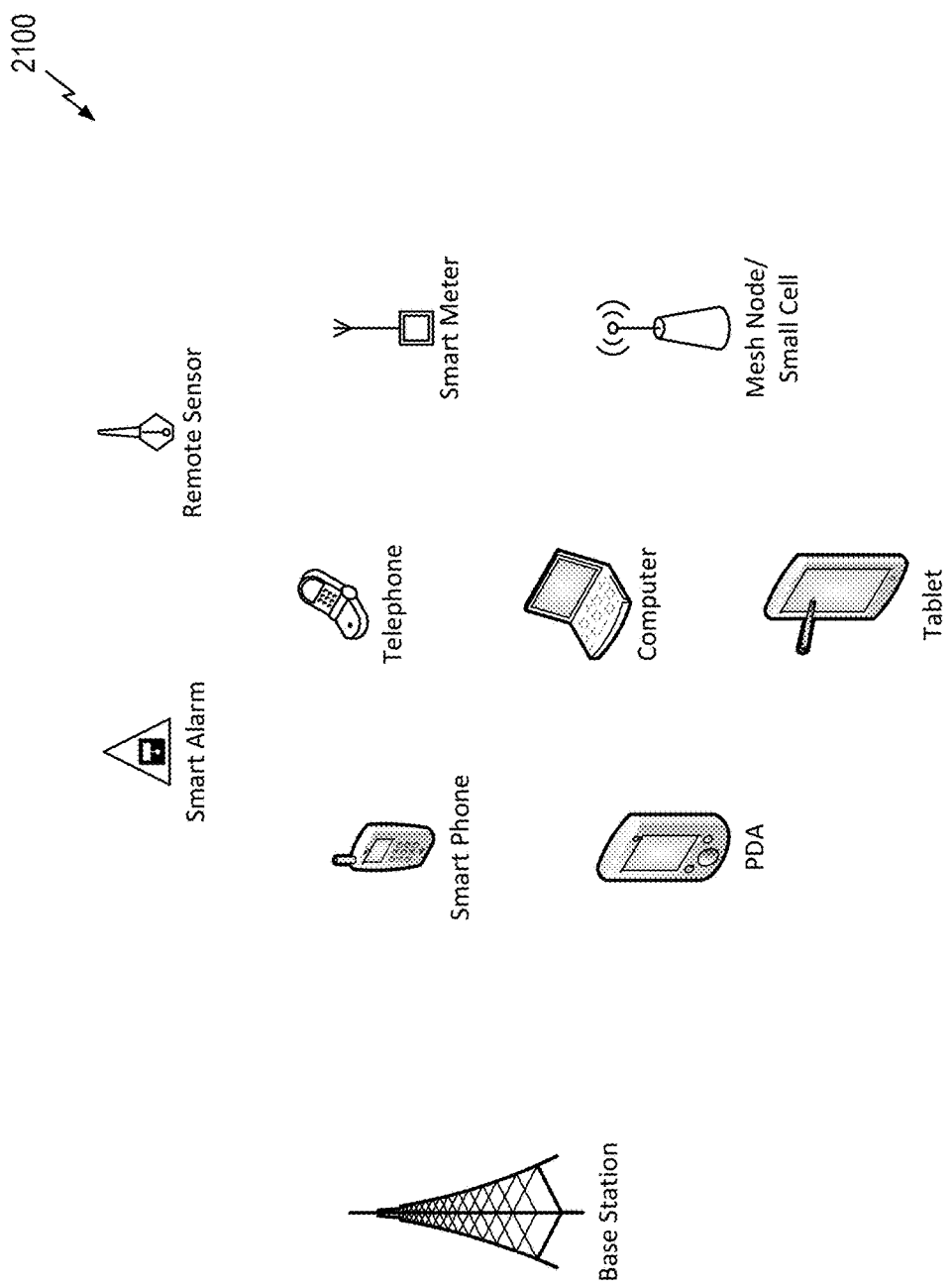
FIG. 21 illustrates an example of a wireless communication network within which aspects of the disclosure may be implemented.

FIG. 21 is a schematic illustration of a wireless communication network 2100 including multiple communication entities as it may appear in some aspects of the disclosure. As described herein, a scheduling entity or an entity being scheduled may reside in, or be a part of, a base station, a smart phone, a small cell, or other entity. Subordinate entities or mesh nodes may reside in, or be a part of, a smart alarm, a remote sensor, a smart phone, a telephone, a smart meter, a personal data assistant (PDA), a personal computer, a mesh node, and/or a tablet computer. Of course, the illustrated devices or components are merely examples, and any suitable node or device may appear within a wireless communication network within the scope of the present disclosure.

Additional Aspects

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while example implementations may have been discussed herein as device, system, or method implementations, it should be understood that such example implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" or "at least one or more of" or "one or more of" a list of items refers to any combination of those items, including single members. As an example, "at least one of: a, b, or c" is intended to cover: a; b; c; a and b; a and c; b and c; a, b and c; 2a; 2b; 2c; 2a and b; a and 2b, 2a and 2b; and so on. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. An apparatus for communication, comprising:
   a processing circuit configured to identify a physical resource block (PRB) bundle that comprises at least one PRB, change a precoding matrix indicator (PMI) associated with the PRB bundle relative to the PMI of at least one other PRB bundle and select a pilot structure for the PRB bundle in response to the change in the PMI, wherein the pilot structure comprises pilots uniformly spread across the PRB bundle; and
   a communication interface coupled to the processing circuit and configured to transmit an indication of the pilot structure, wherein the indication of the pilot structure comprises an indication of the change in the PMI of the PRB bundle relative to the PMI of the at least one other PRB bundle.

2. The apparatus of claim 1, wherein the processing circuit is further configured to determine another pilot structure where pilot density differs over time within a transmission period, wherein the pilot density at a beginning portion of the transmission period is higher than the pilot density at a later portion of the transmission period.

3. The apparatus of claim 2, wherein the pilot density is different for different transmission time intervals (TTIs) within the transmission period.

4. The apparatus of claim 2, wherein the pilot density further differs with respect to frequency during the transmission period.

5. The apparatus of claim 2, wherein a transmit power of pilots at a beginning portion of the transmission period is higher than the transmit power of pilots at a later portion of the transmission period.

6. The apparatus of claim 2, wherein the transmission period corresponds to a traffic burst.

7. The apparatus of claim 2, wherein the processing circuit is further configured to:
   change a beamforming configuration; and
   determine the other pilot structure as a result of the change.

8. The apparatus of claim 1, wherein the pilot structure is for a demodulation reference signal (DMRS).

9. The apparatus of claim 1, wherein:
   the processing circuit is further configured to determine that a particular pilot structure is specified for successive transmission time intervals (TTIs); and
   the communication interface is further configured to transmit an indication that a pilot from a prior TTI can be used for channel estimation, wherein the indication that a pilot from a prior TTI can be used for channel estimation is transmitted as a result of the determination that a particular pilot structure is specified for successive TTIs.

10. The apparatus of claim 1, wherein, to select the pilot structure, the processing circuit is further configured to select spacing for pilots based on a bandwidth of the PRB bundle.

11. The apparatus of claim 1, wherein the indication of the selected pilot structure comprises the precoding matrix indicator (PMI).

12. The apparatus of claim 1, wherein the indication of the selected pilot structure indicates a difference between neighbor resource block (RB) PMIs.

13. The apparatus of claim 1, wherein:
the processing circuit is further configured to determine a traffic-to-pilot ratio (TPR) for demodulation reference signals (DMRSs); and
the communication interface is further configured to transmit an indication of the TPR.

14. The apparatus of claim 13, wherein the TPR is determined based on at least one or more of: a modulation and coding scheme (MCS), a rank, or a rate.

15. The apparatus of claim 1, wherein the processing circuit is further configured to perform an independent network selection of the PMI for the PRB bundle.

16. The apparatus of claim 1, wherein the communication interface is further configured to transmit the PMI, wherein the PMI indicates the pilot structure.

17. A method of communication, comprising:
identifying a physical resource block (PRB) bundle that comprises at least one PRB;
changing a precoding matrix indicator (PMI) associated with the PRB bundle relative to the PMI of at least one other PRB bundle;
selecting a pilot structure for the PRB bundle in response to the change in the PMI, wherein the pilot structure comprises pilots uniformly spread across the PRB bundle; and
transmitting an indication of the pilot structure, wherein the indication of the pilot structure comprises an indication of the change in the PMI of the PRB bundle relative to the PMI of the at least one other PRB bundle.

18. The method of claim 17, further comprising:
determining another pilot structure where pilot density differs over time within a transmission period, wherein the pilot density at a beginning portion of the transmission period is higher than the pilot density at a later portion of the transmission period.

19. The method of claim 18, wherein the pilot density is different for different transmission time intervals (TTIs) within the transmission period.

20. The method of claim 18, wherein the pilot density further differs with respect to frequency or transmit power during the transmission period.

21. The method of claim 18, further comprising:
changing a beamforming configuration,
wherein the other pilot structure is determined as a result of the changing.

22. The method of claim 17, wherein the pilot structure is for a demodulation reference signal (DMRS).

23. The method of claim 17, further comprising:
determining that a particular pilot structure is specified for successive transmission time intervals (TTIs); and
transmitting an indication that a pilot from a prior TTI can be used for channel estimation, wherein the indication is transmitted as a result of the determination that a particular pilot structure is specified for successive TTIs.

24. The method of claim 17, further comprising:
determining a traffic-to-pilot ratio (TPR) for demodulation reference signals (DMRSs); and
transmitting an indication of the TPR.

25. A non-transitory computer-readable medium storing computer-executable code, including code to:
identify a physical resource block (PRB) bundle that comprises at least one PRB;
change a precoding matrix indicator (PMI) associated with the PRB bundle relative to the PMI of at least one other PRB bundle;
select a pilot structure for the PRB bundle in response to the change in the PMI, wherein the pilot structure comprises pilots uniformly spread across the PRB bundle; and
transmit an indication of the pilot structure, wherein the indication of the pilot structure comprises an indication of the change in the PMI of the PRB bundle relative to the PMI of the at least one other PRB bundle.

26. The computer-readable medium of claim 25, further including code to:
determine another pilot structure where pilot density differs over time within a transmission period, wherein the pilot density at a beginning portion of the transmission period is higher than the pilot density at a later portion of the transmission period.

27. The computer-readable medium of claim 26, further including code to:
change a beamforming configuration; and
determine the other pilot structure as a result of the change.

28. The computer-readable medium of claim 25, further including code to:
determine that a particular pilot structure is specified for successive transmission time intervals (TTIs); and
transmit an indication that a pilot from a prior TTI can be used for channel estimation, wherein the indication that a pilot from a prior TTI can be used for channel estimation is transmitted as a result of the determination that a particular pilot structure is specified for successive TTIs.

29. The computer-readable medium of claim 25, further including code to:
determine a traffic-to-pilot ratio (TPR) for demodulation reference signals (DMRSs); and
transmit an indication of the TPR.

* * * * *